United States Patent
Vdovin et al.

(10) Patent No.: US 10,257,503 B2
(45) Date of Patent: Apr. 9, 2019

(54) AUTOSTEREOSCOPIC DISPLAY DEVICE

(71) Applicant: KONINKLIJKE PHILIPS N.V., Eindhoven (NL)

(72) Inventors: Olexandr Valentynovych Vdovin, Eindhoven (NL); Bart Kroon, Eindhoven (NL); Mark Thomas Johnson, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 145 days.

(21) Appl. No.: 15/105,637

(22) PCT Filed: Dec. 5, 2014

(86) PCT No.: PCT/EP2014/076661
§ 371 (c)(1),
(2) Date: Jun. 17, 2016

(87) PCT Pub. No.: WO2015/091014
PCT Pub. Date: Jun. 25, 2015

(65) Prior Publication Data
US 2016/0323566 A1  Nov. 3, 2016

(30) Foreign Application Priority Data
Dec. 20, 2013  (EP) .................................. 13199067

(51) Int. Cl.
*G02B 27/22* (2018.01)
*H04N 13/00* (2018.01)
(Continued)

(52) U.S. Cl.
CPC ....... *H04N 13/305* (2018.05); *G02B 27/2214* (2013.01); *H04N 13/15* (2018.05); *H04N 2013/0077* (2013.01)

(58) Field of Classification Search
CPC .. H04N 13/305; H04N 13/15; H04N 13/0037; H04N 13/0404; H04N 2013/0077; G02B 27/2214
See application file for complete search history.

(56) References Cited

U.S. PATENT DOCUMENTS 5,602,658 A  2/1997  Ezra
6,064,424 A  5/2000  Van Berkel et al.
(Continued)

FOREIGN PATENT DOCUMENTS

GB  2403863 A  12/2005
WO  2012176102 A1  12/2012

OTHER PUBLICATIONS

"Multi-Projection of Lenticular Displays to Construct a 256 View Super Multi-View Display" Takaki et al, Optics Express Apr. 26, 2010, vol. 18, No. 9.

*Primary Examiner* — Michael E Teitelbaum

(57) ABSTRACT

An autostereoscopic display device has a particular design of display panel for use with a forming arrangement having non-slanted view forming elements (being for example a lenticular or parallax barrier array). The display panel sub-pixels incorporate a slant into their shape. The display panel is designed to enable low slant angles while still enabling efficient mapping of the 2D display panel pixels to the 3D pixels, allow for square 3D sub-pixels on rectangular grid which gives better distribution of color components with improved uniformity and improved rendering in 3D mode.

28 Claims, 31 Drawing Sheets

(51) Int. Cl.
*H04N 13/15* (2018.01)
*H04N 13/305* (2018.01)

(56) References Cited

U.S. PATENT DOCUMENTS

| | | |
|---|---|---|
| 6,118,584 A | 9/2000 | Van Berkel et al. |
| 6,787,987 B2 | 9/2004 | Duineveld et al. |
| 8,259,241 B2 | 9/2012 | Van Berkel et al. |
| 8,384,747 B2 | 2/2013 | Van Berkel et al. |
| 8,817,082 B2 | 8/2014 | Van Der Horst et al. |
| 9,250,446 B2 | 2/2016 | Krijn et al. |
| 2007/0291054 A1 | 12/2007 | Shin |
| 2008/0079662 A1 | 4/2008 | Saishu |
| 2010/0039698 A1 | 2/2010 | Robinson |
| 2010/0259697 A1 | 10/2010 | Sakamoto et al. |
| 2011/0075256 A1 | 3/2011 | De Zwart et al. |
| 2011/0181706 A1 | 7/2011 | Harrold et al. |
| 2011/0187948 A1 | 8/2011 | Kashwagi et al. |
| 2012/0229456 A1 | 9/2012 | Takahashi |
| 2012/0262362 A1 | 10/2012 | Uehara |
| 2013/0050807 A1 | 2/2013 | Lee |
| 2013/0128354 A1 | 5/2013 | Whangbo |
| 2013/0194521 A1 | 8/2013 | Whangbo |
| 2013/0242386 A1 | 9/2013 | Koito et al. |
| 2013/0250568 A1 | 9/2013 | Koito et al. |
| 2013/0300956 A1 | 11/2013 | Chen |
| 2014/0029094 A1 | 1/2014 | Kroon et al. |
| 2014/0111854 A1 | 4/2014 | Kroon et al. |
| 2014/0152927 A1 | 6/2014 | Watanabe |

(a)

(b)

(c)

(d)

AUTOSTEREOSCOPIC DISPLAY DEVICE

CROSS-REFERENCE TO PRIOR APPLICATIONS

This application is the U.S. National Phase application under 35 U.S.C. § 371 of International Application No. PCT/EP2014/076661, filed on Dec 05, 2014, which claims the benefit of EP Patent Application No. EP 13199067.3, filed on Dec 20, 2013. These applications are hereby incorporated by reference herein.

FIELD OF THE INVENTION

This invention relates to an autostereoscopic display device which comprises a display panel having an array of display pixels, and an arrangement for directing different views to different physical locations.

BACKGROUND OF THE INVENTION

A known autostereoscopic display device comprises a two-dimensional liquid crystal display panel having a row and column array of display pixels acting as an image forming means to produce a display. An array of elongated lenses extending parallel to one another overlies the display pixel array and acts as a view forming means. These are known as "lenticular lenses". Outputs from the display pixels are projected through these lenticular lenses, which function to modify the directions of the outputs.

The lenticular lenses are provided as a sheet of lens elements, each of which comprises an elongate semi-cylindrical lens element. The lenticular lenses extend in the column direction of the display panel, with each lenticular lens overlying a respective group of two or more adjacent columns of display sub-pixels.

Each lenticular lens can be associated with two columns of display sub-pixels to enable a user to observe a single stereoscopic image. A sub-pixel is the smallest addressable pixel structure and has only one single color. Generally a group of sub-pixels, which together can generate all desired colors, is denoted as pixel. Instead, each lenticular lens can be associated with a group of three or more adjacent display sub-pixels in the row direction. Corresponding columns of display sub-pixels in each group are arranged appropriately to provide a vertical slice from a respective two dimensional sub-image. As a user's head is moved from left to right a series of successive, different, stereoscopic views are observed creating, for example, a look-around impression.

The above described autostereoscopic display device produces a display having good levels of brightness. However, one problem associated with the device is that the views projected by the lenticular sheet are separated by dark zones caused by "imaging" of the non-emitting black matrix which typically defines the display sub-pixel array. These dark zones are readily observed by a user as brightness non-uniformities in the form of dark vertical bands spaced across the display. The bands move across the display as the user moves from left to right and the pitch of the bands changes as the user moves towards or away from the display.

This banding problem arises in particular because current autostereoscopic displays employ a matrix of pixels that are square in shape. In order to generate images in color, the pixels are divided into sub-pixels. Traditionally, each pixel is divided into 3 sub-pixels, transmitting or emitting red (R), green (G) and blue (B) light, respectively. Sub-pixels of equal color are typically arranged in columns. This is the structure of the most standard RGB panel, with so-called RGB-stripes. Each sub-pixel is surrounded by the black matrix. It is the regularity of the pixel grid (and color distribution) combined with the magnification of the lenticular lens which causes the banding problem.

Another problem is that vertically aligned lenses result in a reduction in resolution in the horizontal direction only, while the resolution in the vertical direction is not altered.

Both of these issues can be at least partly addressed by the well-known technique of slanting the lenticular lenses at an acute angle relative to the column direction of the display pixel array, for example as described in U.S. Pat. No. 6,064,424A1. The use of slanted lenses is thus recognised as an essential feature to produce different views with near constant brightness, and a good RGB distribution behind the lenses. The slanting of the lenses distributes the resolution loss between horizontal and vertical direction.

However, the slanted lens solution has some disadvantages: a slanted lens may be more difficult to manufacture, particularly when a switchable solution is desired and, more importantly, the 3D pixels are non-rectangular, and are not arranged along row and column directions. This introduces some aliasing for horizontal and vertical lines, especially when used in text and computer graphics.

WO2010/070564 discloses an arrangement in which the lens pitch and lens slant are selected in such a way as to provide an improved pixel layout in the views created by the lenticular array, in terms of spacing of color sub-pixels, and color uniformity.

The present invention relates specifically to autostereoscopic displays in which non-slanted lenticular lenses, barriers or a non-slanted microlens array are used. However, although it is considered an important advantage of the invention that a display with reduced banding can be made without the need for slanting the lens (or barrier), it is not excluded that in addition the lens can also be slanted. It is known that an equivalent to slanting the lenses is to stagger the pixel rows so that the columns effectively have a stepped slant. This is disclosed for example in WO 2012/176102.

Although the solution disclosed in WO 2012/176102 will have less banding problems, the shape of the sub-pixels can still be perceived as banding. The staggered layout also gives rise to a 3D sub-pixel shape which depends on the type of 2D pixel grid, and may be not ideal.

Another important aspect is a relationship between the display sub-pixel sizes and shapes and the way the 2D sub-pixels are mapped to sub-pixels of the 3D images.

For example the use of a standard RGB panel and slanted lenticulars with certain relation between the lens pitch and slant result in the 3D pixels of the views ordered on a hexagonal grid (so-called delta-nabla pattern), which creates problems in rendering images with sharp horizontal and vertical edges without aliasing, especially text.

It is an aim of the current invention to provide new pixel layouts, which in combination with non-slanted view forming arrangements will create a 3D display with high quality, with reduced amount of banding, smooth transitions between the views, and in particular by taking into account the mapping of 2D sub-pixel sizes and shapes, and the resulting 3D image sub-pixels, which are preferably arranged along the rows and column directions with good and uniform color distribution.

SUMMARY OF THE INVENTION

The invention is defined by the claims.

According to an example, there is provided an autostereoscopic display device comprising:

a display having an array of display pixels for producing a display, and defining a display area having sides and a top and bottom, wherein the display pixels are arranged in one or two sets of orthogonal rows and columns of color sub-pixels, parallel to the top and bottom and to the sides of a display panel respectively; and a view forming arrangement arranged in registration with the display for projecting a plurality of views towards a user in different directions, wherein the color sub-pixels comprise at least two opposing sides which are generally slanted with respect to the sides of the display area, and wherein for at least two adjacent rows the sub-pixels in the same columns do not all have the same color and the sub-pixel color pattern for the rows repeats only every two or more rows.

What is meant by a row color pattern repeating is that the order of colors of the sub-pixels is once again the same, as well as the row position (i.e. the first sub-pixel in the row has the same color) and also the sub-pixel orientation and shape is the same. Examples below show that if the sub-pixels have a shape which alters orientation between rows, there can be twice as many rows before the identical pattern repeats. The concept of a "row" is clear in some examples with a regular grid. For other examples where there is partial sub-pixel overlap, a row can be defined as a set of sub-pixels connected together by the row addressing circuitry.

This arrangement provides a design of pixel shapes and distributions in the 2D panel, which allows a view forming arrangement to be applied without slant, which is potentially more cost-effective and easier to manufacture and align. It also can in some examples create substantially square 3D sub-pixels on a rectangular grid which gives better color distribution and improves rendering in the 3D mode. The rectangular sub-pixel grid of the 3D rendered images can also be designed to be square, with good color distribution. Note that the resulting 2D panel if used without view forming arrangement is not ideally designed for 2D display applications. The design is optimised for the 3D application.

Each row of sub-pixels preferably includes sub-pixels of at least two colors. Furthermore, preferably no two sub-pixels which are adjacent in the row direction have the same colour.

In one set of examples, each row of sub-pixels includes sub-pixels of exactly two colors.

By providing only two different color sub-pixels in the row direction, the 3D unit cell is made compact. Preferably, the rows and columns extend parallel to the top and bottom and the sides of the display area, respectively (although adjacent rows and columns can be staggered, so that the sub-pixels are in a diamond pattern for example). This means that the sub-pixels can be driven as an orthogonal grid. This will result in the panel design which is good for text and graphics rendering and simplifies image rendering and filtering.

In one set of examples, the display can comprise rows of sub-pixels which repeat their sub-pixel color pattern every two rows, with a first row of two color sub-pixels, and a second row of a different set of two color sub-pixels. This enables each pixel to be formed from only two rows of sub-pixels, giving a compact pixel layout. The sub-pixel layout can be designed to reduce banding or improve perceptual resolution.

The first row can comprise a repeating pattern Rx, and the second row comprises a repeating pattern yB, wherein R is a red sub-pixel, B is a blue sub-pixel, where x and y (possibly x=y) can be color components that have a strong visibility such as Green, Yellow, White or Cyan This layout results in a well-distributed diamond or rectangular grid of 3D color pixel components.

In one arrangement, the display comprises columns of sub-pixels which repeat their sub-pixel color pattern every two columns, wherein a first column comprises a repeating pattern RB, and a second column comprises a repeating pattern xy. This can be used to give very sharp vertical lines (for example if x=y). In another arrangement, the first column comprises a repeating pattern Bx, and a second column comprises a repeating pattern yR.

The display can be arranged with x=y=Green. This gives twice as many green sub-pixels as red or blue sub-pixels.

In an alternative set of examples, the display comprises rows of sub-pixels which repeat their sub-pixel color pattern every four rows, with a first pair of adjacent rows of two color sub-pixels with the same sub-pixel colors and order, and a second pair of adjacent rows of a different set of two color sub-pixels with the same sub-pixel colors and order. As for the examples above, the first two rows can comprise a repeating pattern Rx, and the second two rows can comprise a repeating pattern yB, wherein R is a red sub-pixel, B is a blue sub-pixel, and x and y can be color components that have a strong visibility, each one of yellow, green, white and cyan color sub-pixels. The display preferably then comprises columns of sub-pixels parallel to the sides of the display area and which repeat their sub-pixel color pattern every four columns, wherein a first two columns comprise a repeating pattern Bx, and a second two columns comprise a repeating pattern yR. Again, one possibility is x=y=Green. This gives a three color pixel.

In all examples, but particularly of interest for the set of examples with a repeating pattern every four rows of sub-pixels, each sub-pixel can have a centre of area, wherein each row of sub-pixels has the sub-pixel centres of area shifted with respect to the adjacent rows of sub-pixels by a first fraction of the sub-pixel pitch in the row direction, and each column of sub-pixels has the sub-pixel centres of area shifted with respect to the adjacent columns of sub-pixels by a second fraction of the sub-pixel pitch in the column direction.

When the first fraction and second fraction are each ½, this gives a diamond grid of sub-pixels. This arrangement avoids horizontal black edges to the 3D sub-pixels, and the resolution loss is divided between the rows and columns.

In a second set of examples, the display comprises rows of sub-pixels which repeat their sub-pixel color pattern every two or three rows, with each row of exactly three color sub-pixels, wherein the sub-pixel color order alters between the rows, wherein optionally the three colors comprise red, green and blue.

This improves the ability to make thin vertical and horizontal lines.

If the pattern repeats only every two rows (instead of full cycling over three rows) it is possible to make rectangular grids of 3D sub-pixels.

The display can comprise rows of sub-pixels which repeat their sub-pixel color pattern every four rows, with the rows together comprising exactly four color sub-pixels, wherein the sub-pixel color order cycles between the rows, wherein optionally the four colors comprise red, x, blue and y, wherein x and y can be color components that have a strong visibility, each one of green, yellow, white and cyan, for example red, blue, green and white.

In another variation, the display comprises rows of sub-pixels which repeat their sub-pixel color pattern every two rows, with the rows together comprising exactly four color sub-pixels, wherein optionally the four colors comprise Red, x, Blue and y, wherein x and y can be color components that have a strong visibility, each one of Green, Yellow, White and Cyan, for example red, blue, green and white.

This can give good rectangular or diamond grids of 3D sub-pixels.

The individual rows can have all four color sub-pixels or only three of them.

Some columns can comprise only pixels of color x and/or y, wherein x and y can be color components that have a strong visibility, each one of green, yellow, white and cyan. This enables sharp vertical lines to be formed.

The sub-pixel shape can take various forms.

In a first design, each sub-pixel of the display comprises a parallelogram with top and bottom edges parallel to the top and bottom of the display area and side edges which comprise the opposing slanted sides. The sub-pixels can all have the same slant direction (defining a regular tessellation of the parallelograms) or else alternate rows of sub-pixels can have opposite slant directions.

When opposite slant directions are used, viewing the 3D display at different angles will give different amounts of black matrix for consecutive rows projected into angular space. Thus the effect of regularity of the dark bands over the display will be further reduced and spread over the rows of a display. 3D pixels in consecutive rows can appear to be slightly "tilted" in alternating directions for the consecutive rows. This can create an additional smoothening effect on the 3D view.

In a second design each sub-pixel of the display comprises a parallelogram with first and second edges with one slant direction with respect to the direction of the display area sides, and third and fourth edges with an opposite slant direction with respect to the direction of the display area sides. Each sub-pixel of the display can for example comprise an essentially rhombus shape, although as discussed below, the shapes without perfectly straight edges are intended to be within the scope of this application.

The display can comprises rows of sub-pixels which repeat their sub-pixel color pattern every two or three rows, with each row of exactly three color sub-pixels, wherein the sub-pixel color order alters between the rows, wherein optionally the three colors comprise red, green and blue. This applies to all sub-pixel shapes.

In particular when the sub-pixel comprises a generally rhombus shape, the display can comprise rows of sub-pixels which repeat their sub-pixel color pattern every four rows, with the rows together comprising three or four color sub-pixels. However, the rows of sub-pixels can repeat their sub-pixel color pattern every eight rows, with the rows together comprising exactly three or four color sub-pixels.

Optionally there can be four colors and which can comprise red, x, blue and y, wherein x and y can be color components that have a strong visibility, each one of green, yellow, white and cyan. For example the four colors are red, blue, green and yellow. Although there are only four different colors, the pattern can in some examples repeat every eight rows because the tessellated rhombus shapes give a fractional shift between rows of half a sub-pixel pitch in the row direction.

Each sub-pixel can have an aspect ratio "a" comprising the ratio of maximum width at any height up the sub-pixel to the maximum height, wherein the slant direction has a slant value $s=\tan\theta$, and wherein $a=0.8$ s to 1.2 s or more preferably $a=0.95$ s to 1.05 s or more preferably $a=s$, and $s<=\frac{1}{3}$.

This arrangement can also enable a low slant angle of the sub-pixel shapes to be used (for example $s<\frac{1}{3}$), but the 2D sub-pixels are efficiently used when mapping to the 3D displayed images. In preferred embodiments, the device can be arranged such that each 2D sub-pixel contributes to only one 3D pixel.

The choice $s=a$ gives an optimum reduction of crosstalk in addition to providing efficient pixel mapping.

The view forming arrangement can comprise elongate lenses. In this case, the pitch P of the lenses expressed in units of the width of the display sub-pixels, can satisfy: $(1/Ka)-1<=P<=(1/Ka)+1$ where K is an integer multiple which can be 1 or more.

BRIEF DESCRIPTION OF THE FIGURES

Embodiments of the invention will now be described, purely by way of example, with reference to the accompanying drawings, in which.

DETAILED DESCRIPTION OF THE EMBODIMENTS

The invention provides an autostereoscopic display device with a particular design of display panel for use with a view forming arrangement having non-slanted view forming elements (being for example a lenticular or parallax barrier array). The display panel sub-pixels incorporate a slant into their shape. The display panel is designed to enable low slant angles while still enabling efficient mapping of the 2D display panel pixels to the 3D pixels. Before describing the invention in detail, the configuration of a known autostereoscopic display will first be described.

Figure 1:
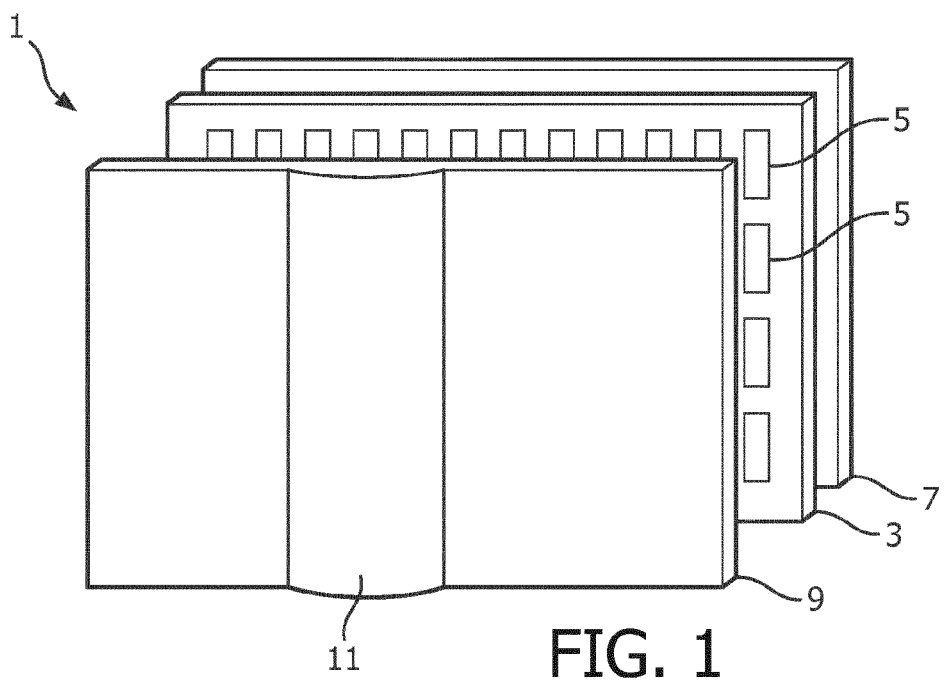
FIG. 1 is a schematic perspective view of a known autostereoscopic display device.

FIG. 1 is a schematic perspective view of a known multi-view autostereoscopic display device 1. The known device 1 comprises a liquid crystal display panel 3 of the active matrix type that acts as an image forming means to produce the display. The device can instead use OLED pixels.

The display panel 3 has an orthogonal array of display sub-pixels 5 arranged in rows and columns. For the sake of clarity, only a small number of display sub-pixels 5 are shown in FIG. 1. In practice, the display panel 3 might comprise about one thousand rows and several thousand columns of display sub-pixels 5.

The structure of the liquid crystal display panel 3 is entirely conventional. In particular, the panel 3 comprises a pair of spaced transparent glass substrates, between which an aligned twisted nematic or other liquid crystal material is provided. The substrates carry patterns of transparent indium tin oxide (ITO) electrodes on their facing surfaces. Polarising layers are also provided on the outer surfaces of the substrates.

Each display sub-pixel 5 comprises opposing electrodes on the substrates, with the intervening liquid crystal material there between. The shape and layout of the display sub-pixels 5 are determined by the shape and layout of the electrodes and a black matrix arrangement provided on the front of the panel 3. The display sub-pixels 5 are regularly spaced from one another by gaps.

Each display sub-pixel 5 is associated with a switching element, such as a thin film transistor (TFT) or thin film diode (TFD). The display sub-pixels are operated to produce the display by providing addressing signals to the switching elements, and suitable addressing schemes will be known to those skilled in the art.

The display panel 3 is illuminated by a light source 7 comprising, in this case, a planar backlight extending over the area of the display pixel array. Light from the light source 7 is directed through the display panel 3, with the individual display sub-pixels 5 being driven to modulate the light and produce the display.

The display device 1 also comprises a lenticular sheet 9, arranged over the display side of the display panel 3, which performs a view forming function. The lenticular sheet 9 comprises a row of lenticular lenses 11 extending parallel to one another, of which only one is shown with exaggerated dimensions for the sake of clarity. The lenticular lenses 11 act as view forming elements to perform a view forming function.

The lenticular lenses 11 are in the form of convex cylindrical elements, and they act as a light output directing means to provide different images, or views, from the display panel 3 to the eyes of a user positioned in front of the display device 1.

The autostereoscopic display device 1 shown in FIG. 1 is capable of providing several different perspective views in different directions. In particular, each lenticular lens 11 overlies a small group of display sub-pixels 5 in each row. The lenticular element 11 projects each display sub-pixel 5 of a group in a different direction, so as to form the several different views. As the user's head moves from left to right, his/her eyes will receive different ones of the several views, in turn.

Figure 2:
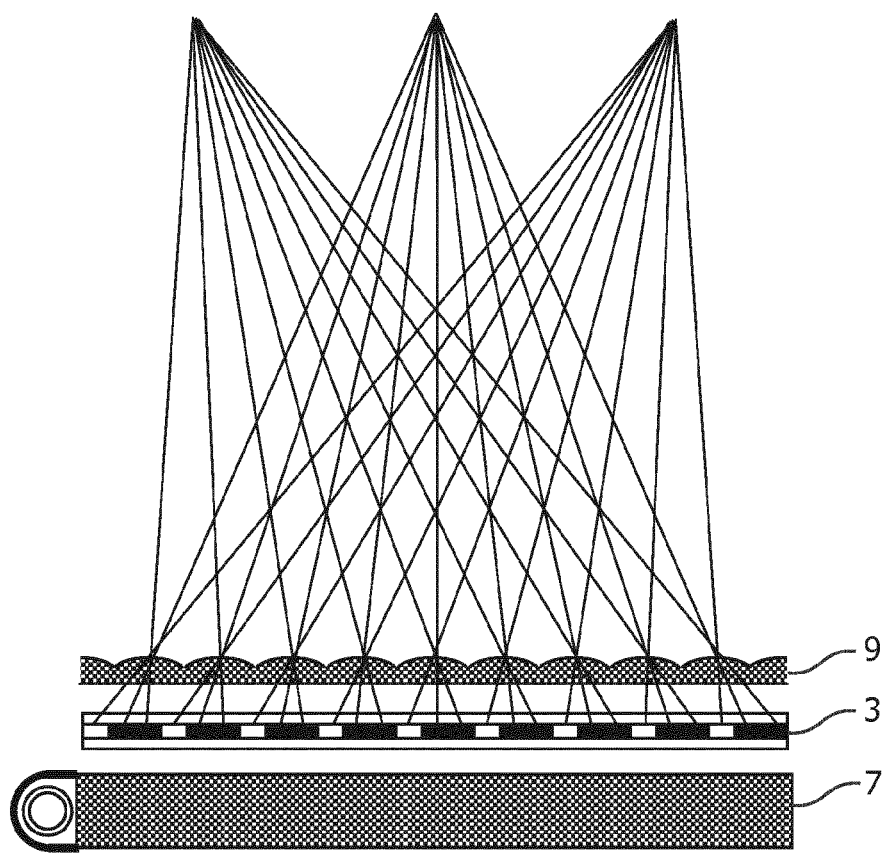
FIG. 2 is a schematic cross sectional view of the display device shown in FIG. 1.

FIG. 2 shows the principle of operation of a lenticular type imaging arrangement as described above and shows the light source 7, display panel 3 and the lenticular sheet 9. The arrangement provides three views each projected in different directions. Each sub-pixel of the display panel 3 is driven with information for one specific view.

The above described autostereoscopic display device produces a display having good levels of brightness. It is well known to slant the lenticular lenses at an acute angle relative to the column direction of the display pixel array. This enables an improved brightness uniformity and also divides the resolution loss in the horizontal and vertical directions more equally.

Whatever the mechanism used to obtain an auto-stereoscopic display system, resolution is traded for 3D depth: the more views, the higher the loss in resolution per view. This is illustrated in FIG. 3, which shows the native sub-pixel layout of the 2D display panel as well as, on the same scale, the sub-pixel layout in a 3D view obtained by putting a lenticular in front of the panel.

The sub-pixel layout shown for the 3D image represents the sub-pixel pattern as seen from one viewing direction. The same geometric sub-pixel pattern is seen from all viewing directions, but different sets of sub-pixels of the underlying 2D display are visible. For a given viewing direction as shown, a blue 3D sub-pixel is an image of one or more blue sub-pixels of the native 2D display (and the same applies for green and red).

The lenticular has a slant $s=\tan(\theta)=\frac{1}{6}$ and a lens pitch $P_L=2.5\ p_x$ (where $p_x$ in this case is shown as the full pixel pitch in the row direction, so that $P_L=7.5$ is expressed in units of the sub-pixel pitch in the row direction) resulting in 15 views. In this case, $P_x=P_y$. The lens pitch is thus 7.5 when expressed as a number of sub-pixel dimensions in the row direction. The 3D image has a repeating pattern of sub-pixels, and the colors of a few sub-pixels (R, G and B) are shown so that all colors in the pattern can be understood. Each color is output as a diamond-shaped grid of sub-pixels which are interleaved with each other.

Figure 3:
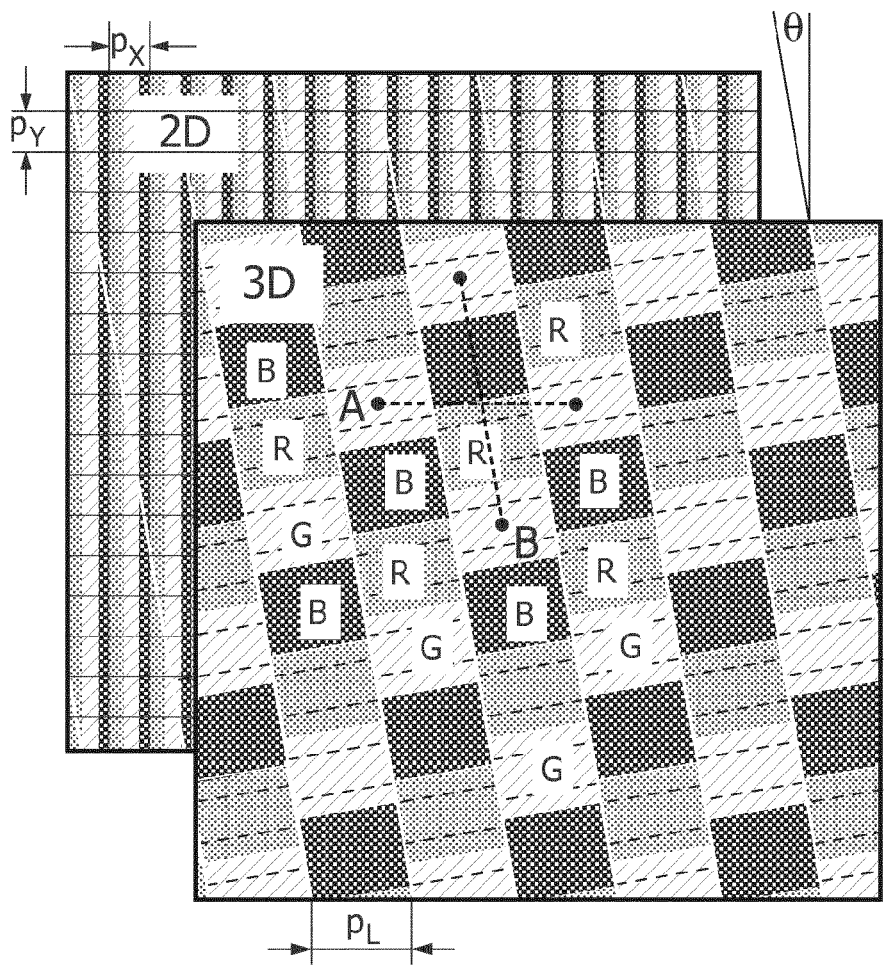
FIG. 3 shows how the known RGB pixel is projected by the lenticular arrangement in a known display.

As seen in FIG. 3, for the particular viewing direction shown, each 3D sub-pixel has contributions from three 2D sub-pixels (each 3D sub-pixel is divided into three sections). This is because a line parallel to the lenticular lens axis (such as the white lines shown over the 2D display panel) cross three sub-pixels of one color, followed by three sub-pixels of the next color, followed by three sub-pixels of the last color. For different viewing angle directions, there can instead be two full sub-pixels for each 3D sub-pixel.

The slant angle of the lenticular as well as its pitch should be chosen such that a number of requirements are fulfilled as much as possible:
(i) A favourable distribution of sub-pixels should be obtained for each 3D view.

In each of the 3D views the sub-pixels of each color should be distributed in a pattern that is regular and having a resolution that is similar for the horizontal and vertical direction. As shown in FIG. 3, the horizontal distance between neighbouring green sub-pixels (labelled A in FIG. 3) should be comparable to the vertical distance between neighbouring green sub-pixels (labelled B). This should hold for the other colors as well.
(ii) The surface area occupied by sub-pixels of the same colors should be equal for each 3D view.
(iii) Absence of moiré.

The combination of a lenticular in front of a display panel is very susceptible to the occurrence of moiré ('banding'). This effect is caused by the combination of the periodicity of the sub-pixel layout of the display panel and the periodicity of the lenticular. It is worsened by the fact that the sub-pixels of the display panel are surrounded by a black matrix. By means of slanting the lenticular and by choosing the lenticular to have a width that is not equal to an integer times the width of a sub-pixel (i.e. by using fractional views), this moiré effect can be minimised.

Figure 4:
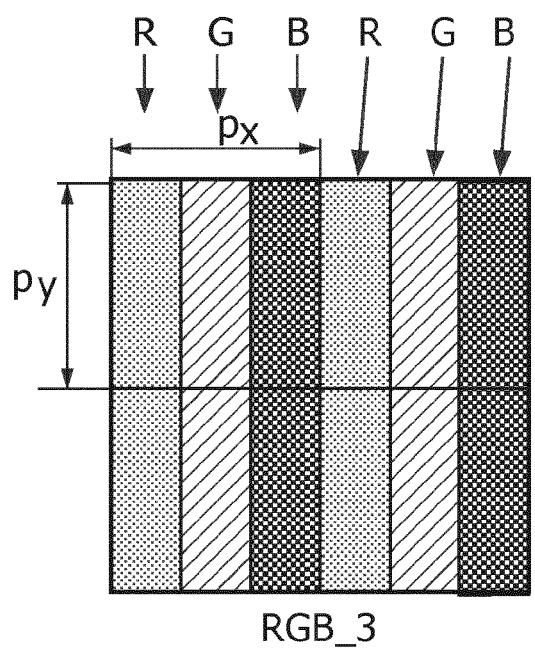
FIG. 4 shows the known RGB pixel layout.

FIG. 4 shows a conventional RGB striped pixel layout. Each pixel has three sub-pixels, hence the subscript "3" in RGB_3. Pixel layouts using more than 3 primary colors are also known, and these are termed "multi-primary" pixel layouts. Several such multi-primary layouts have reached the market and are expected to become mainstream use, Examples of the invention are based on designing a pixel layout for use with non-slanted view forming arrangements, such as lenses. The invention goes beyond simply exchanging the lens slant with pixel column slant, and is additionally based on the relationship between the sub-pixels of the native 2D display and the sub-pixels of the 3D views. Depending on the relationship between the lenticular lens and the display panel design, there will be more or less 2D sub-pixels contributing to a 3D sub-pixel.

For an efficient use of the display panel sub-pixels, the ratio N between the number of 2D sub-pixels $N_{2D}$ that contribute to a number of 3D sub-pixels $N_{3D}$, should be close to one.

This would mean that each independently addressed sub-pixel of the display controls (on average) one sub-pixel of the 3D image, so that the maximum 3D spatial resolution can be obtained i.e., the native 2D resolution divided by the number of views.

Figure 5:
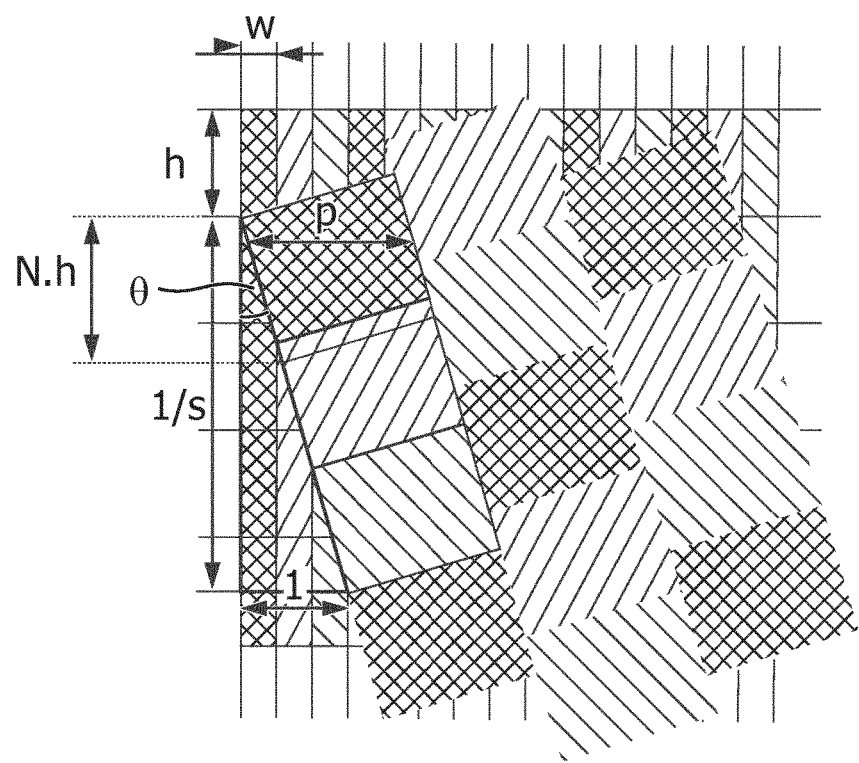
FIG. 5 shows parameters relating to the configuration of the 2D display panel and a projected 3D view.

The inventors have conducted an analysis of the relationship between lens slant and display pixel design. This analysis is applicable also to a design with slanted columns and vertical (non-slanted) lenticulars. The analysis follows:

FIG. 5 shows schematically a 3D pixel layout that results from placing a lenticular lens with pitch p and slant s (where the slant is defined as the tangent of the angle to the vertical column direction, $s=\tan\theta$) on a striped underlying display panel. FIG. 5 is an enlarged view of one 3D pixel from FIG. 3. Note that the slant can be in either direction with respect to the column direction.

The pitch p is the row-direction width of the 3D sub-pixels, which corresponds to the row direction width of the lenticular lens (or barrier or microlens). This pitch is expressed in units of the native 2D display sub-pixel pitch in the row direction, so that in the example shown in FIG. 5, p=5.

The value N is shown in FIG. 5 as the ratio of the height (in the column direction) of a 3D sub-pixel to the height of a 2D sub-pixel. Thus, the value N represents how many 2D sub-pixels contribute to each 3D sub-pixel. As shown, N is not necessarily an integer value, and FIG. 5 shows a value of N slightly greater than 1.

From FIG. 5 it follows that:

$$Nh=w/s$$

When defining the sub-pixel aspect ratio a as $$a=w/h$$

the following expression for N results:

$$N=N_{2D}/N_{3D}=a/s. \qquad \text{Eq. 1}$$

This application relates to a display design in which the desired slant is provided at the level of the native 2D display sub-pixel shape, rather than in the orientation of the lenticular lenses (or other view forming arrangement).

By a similar analysis the inventors have surprisingly discovered that the relationship of Eq. 1 is still applicable. The quality of the display is influenced in several ways by the actual value of the slant formed in the sub-pixel shapes:
1. In order to make efficient use of the display sub-pixels in the generation of the views, one 2D sub-pixel should contribute to each 3D sub-pixel. Therefore the slant should to be close to the aspect ratio, as can be seen in Eq. 1.
2. Small values of slant are preferred. Therefore the preferred slant should be equal to or smaller than $\frac{1}{3}$. Three examples of practical values are $s=\frac{1}{3}$, $s=\frac{1}{6}$ and $s=\frac{1}{9}$.

For current display panels using slanted lenses or barriers, there is always a trade-off between these points when choosing the slant.

By providing a non-slanted lens or barrier design and pixels with a sub-pixel shape which includes a slant, together with a slant value which is chosen so that efficient use of the available sub-pixels is made, a regular 3D sub-pixel layout can be obtained, and which can also be made to be close to regular distribution near to square grid.

The aspect ratio of the native 2D display sub-pixels is used as a design parameter. The aspect ratio a of the sub-pixels can be chosen close to the desired slant $s_{desired}$:

$$a=s_{desired} \qquad \text{Eq.2}$$

Furthermore, the distribution of horizontal and vertical resolution should be approximately equal in the 3D mode.

The examples described below make use of display sub-pixels with opposing sides which are slanted at the angle θ to the vertical lens (or barrier or microlens grid) direction thereby defining a slant direction to an edge of the sub-pixel shape with slant value s=tan θ.

The sub-pixels are preferably elongate in the column direction. As explained above the aspect ratio of the sub-pixel is preferably nearly equal to the tangent of the slant angle. In particular, a=0.8 s to 1.2 s. A small slant is preferably used, in particular s<=⅓.

In this design, only one 2D sub-pixel contributes to the 3D sub-pixel.

Figure 6:
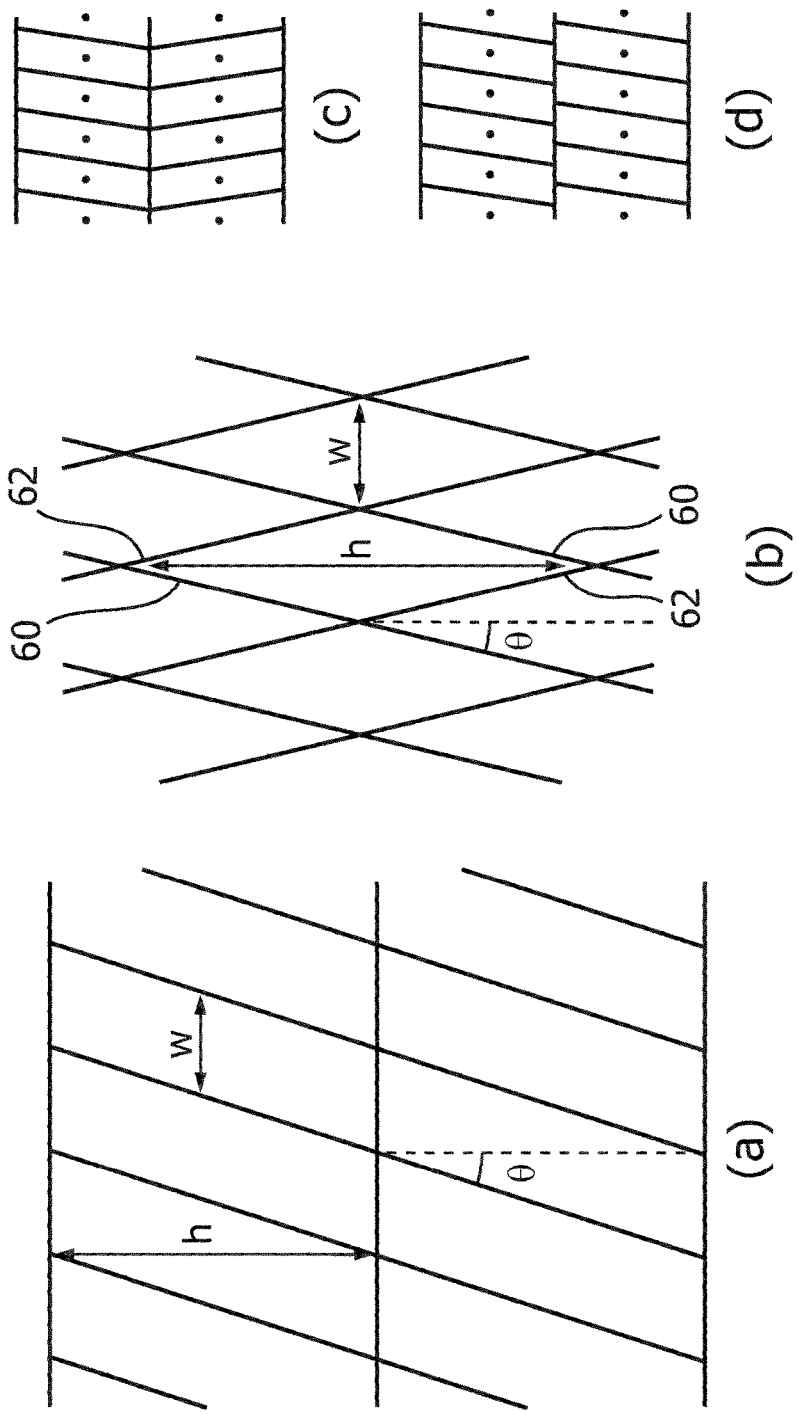
FIG. 6 shows four examples of pixel configuration of the invention.

FIG. 6 shows four possible display sub-pixel shapes which can be used in the invention. These are all polygons with straight sides, but it will be seen from the examples further below that the shape can deviate from this, so that straight sided polygons are an approximation to the sub-pixel shapes that can be used.

FIG. 6(a) shows a sub-pixel shape in the form of a parallelogram with top and bottom edges parallel to the top and bottom of the display area and slanted side edges.

FIG. 6(b) shows a sub-pixel shape in the form of a parallelogram with first and second edges 60 with one slant direction with respect to the (vertical) sides of the display (and thus also with respect to the lens direction since the lens is non-slanted), and third and fourth edges 62 with an opposite slant direction with respect to the vertical. Note that the magnitude of the slant is the same. The shape is shown as a rhombus, but this is just an example. The grid of sub-pixels can be described as a diamond grid. However, if the area centres of all sub-pixels are connected, it will immediately be clear that this can equally be considered to be a triangular or hexagonal grid. When considering the grid to be a diamond grid, it is the superposition of two rectangular grids. Each one defines rows and columns, staggered with respect to each other by half a sub-pixel pitch.

In FIG. 6(a), the slant direction is the same for all sub-pixels. FIG. 6(c) shows that the slant direction can be opposite in alternate rows. The centres of area are shown of the sub-pixels, and they form a rectangular grid.

In FIG. 6(d), the slant direction is the same for all sub-pixels but the sequential rows are staggered. The centres of area are shown of the sub-pixels, and they can then form a rectangular grid with lower slant angles.

The sub-pixel aspect ratio is defined above as:

$$a = w/h$$

where w and h is the sub-pixel width and height respectively (i.e. the sub-pixel dimensions along orthogonal directions parallel to the display area sides and top/bottom). When the sub-pixel edges are slanted with respect to the column direction, the width of the sub-pixel is defined not as its total width, but as the sub-pixel pitch in the row direction. This corresponds to the maximum width at any height up the sub-pixel, and the height corresponds to the maximum height. The significance of h and w are shown in FIG. 6.

In a most preferred implementation:

$$a = s$$

In order to have preferably square 3D pixels derived from a rectangular grid arrangement of 2D sub-pixels, the pitch can be chosen close to the value of 1/a. The pitch is defined as the width of the lenticular lenses, expressed as the number of display sub-pixels which fit into the lens width.

Some general possible values of lenticulars lens pitch (in units of the sub-pixel dimension w along the row direction) are summarized in the table below. The color pattern pitch is the spatial period of a repeating color pattern in the row direction, in the units of sub-pixel-pitch in the row direction.

| a | s | color pattern pitch | pitch* |
|---|---|---|---|
| ⅓ | ⅓ | 2 | . . . 2½, 2⅔, 3, 3⅓, 3½ . . . |
|   |   | 3 | 2, 2⅓, 2½, 3½, 3⅔, 4 |
|   |   | 4 | 2, 2⅓, 2½, 3, 3½, 3⅔, |
| ⅕ | ⅕ | 2 | . . . 4½, 4⅔, 5, 5⅓, 5½ . . . |
|   |   | 3 | 4, 4½, 4⅔, 5, 5⅓, 5½ . . . |
|   |   | 4 | 4½, 4⅔, 5, 5⅓, 5½ . . . |
| ⅙ | ⅙ | 2 | . . . 5, 5⅓, 5½, 6½, 6⅔, 7 . . . |
|   |   | 3 | 4, 4½, 5, 5⅓, 5½, 6½, 6⅔, 7 . . . |
|   |   | 4 | 5, 5⅓, 5½, 6, 6½, 6⅔, 7 . . . |
| 1/7 | 1/7 | 2 | . . . 6½, 6⅔, 7, 7⅓, 7½ . . . |
|   |   | 3 | . . . 6½, 6⅔, 7, 7⅓, 7½ . . . |
|   |   | 4 | . . . 6½, 6⅔, 7, 7⅓, 7½ . . . |

*These are examples of generally possible practical values of lenticulars lens pitch.

Figure 17:
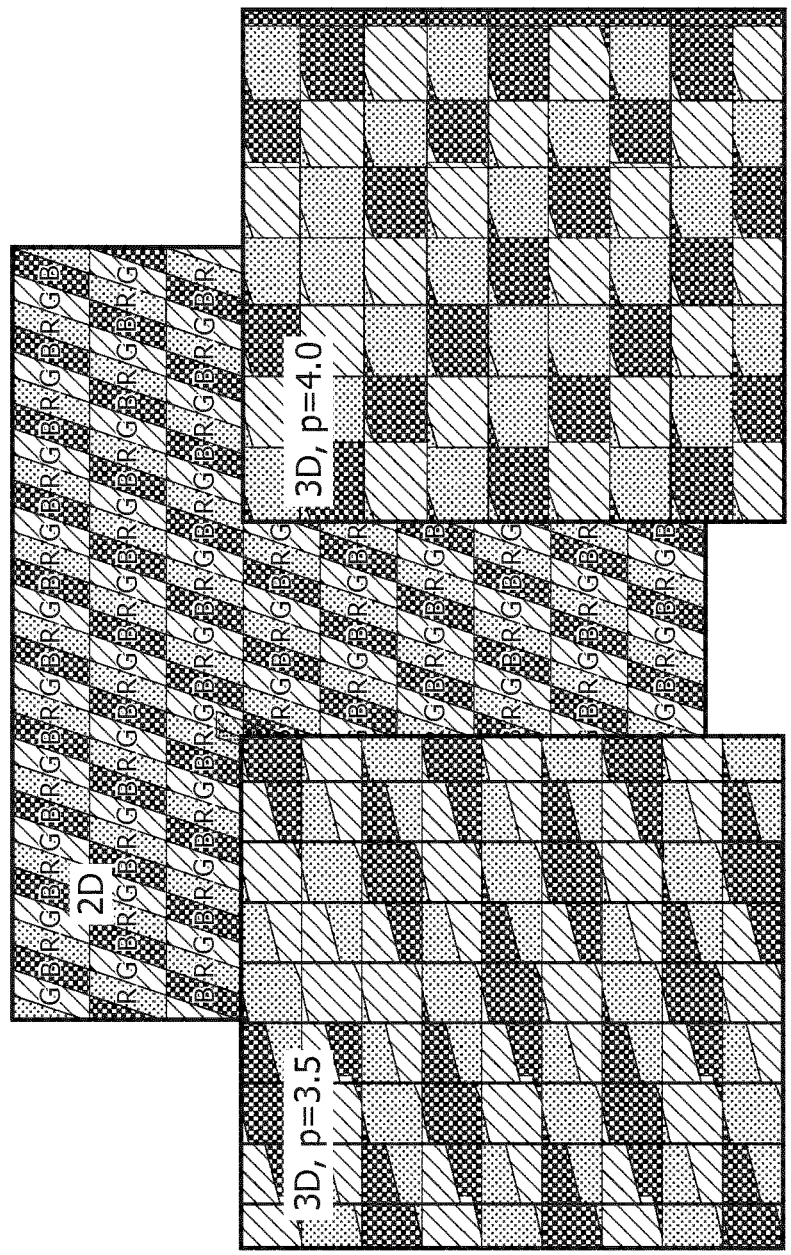
FIG. 17 shows a ninth set of detailed examples of display panel for use in the device of the invention.
Figure 28:
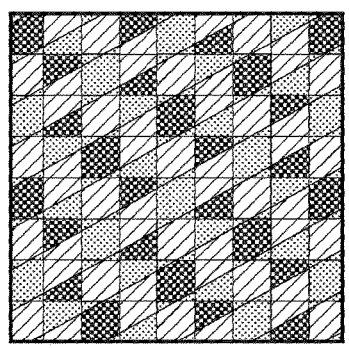
FIG. 28 shows modifications to some of the examples above to make use of fractional lens pitches.
Figure 28:
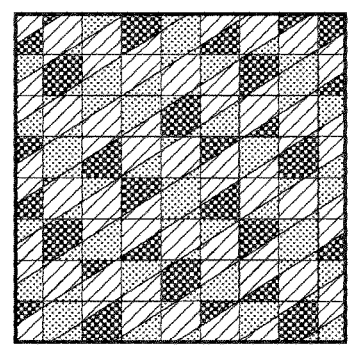
Figure 28:
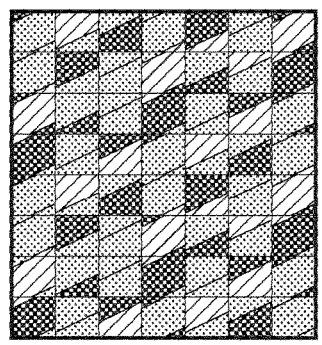
Figure 28:
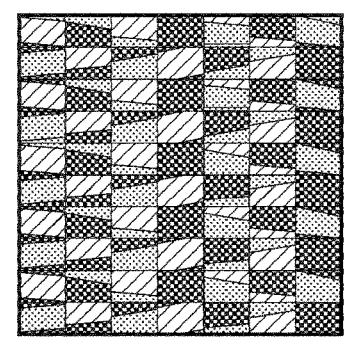

Non-integer pitch values will allow reducing banding even further. For integral pitch values p there are only p possible positions of the lens in relation to any sub-pixel on a row. When looking from an optimal position then some sub-pixels are fully visible while others are fully invisible (this applies to FIGS. 19 to 21 for instance). When shifting the panel with respect to the lens, or when looking at the display from a different angle, then all sub-pixels are at most partially visible (this applies to FIG. 22). Clearly there are more and less preferred angles. A fractional pitch value addresses this problem my making all angles have a similar quality (hence also reducing banding). FIGS. 17 and 28 for example show designs with fractional pitch values.

Preferably, the pitch value is close to the integer number, i.e. the value of 1/a, (in sub-pixel dimension units) in order to have preferably square 3D sub-pixels.

Various examples will now be given. In the following figures, the smallest group of sub-pixel colors along the rows is identified by letters (R=red, G=green, B=blue, Y=yellow, W=white). This smallest group is that which repeats along the row. For example, a designation "RG" means the sub-pixels in the row follow a pattern RGRGRG etc. Also, the sub-pixel colors are identified for the number of columns over which the row pattern repeats. Thus, one 2D full group of sub-pixels is identified, and this 2D group repeats across the display. If one row is shown as RG and the next as BG, this also means the blue sub-pixel is beneath the red sub-pixel in the column direction. In this way, the full sub-pixel layout for the full display can be derived from the color designations provided. Note that for rhombus shaped sub-pixels, the rows do not align, so it is not possible to define which pixels are beneath which others for adjacent rows (i.e. adjacent rows are in different sets of columns).

Figure 7:
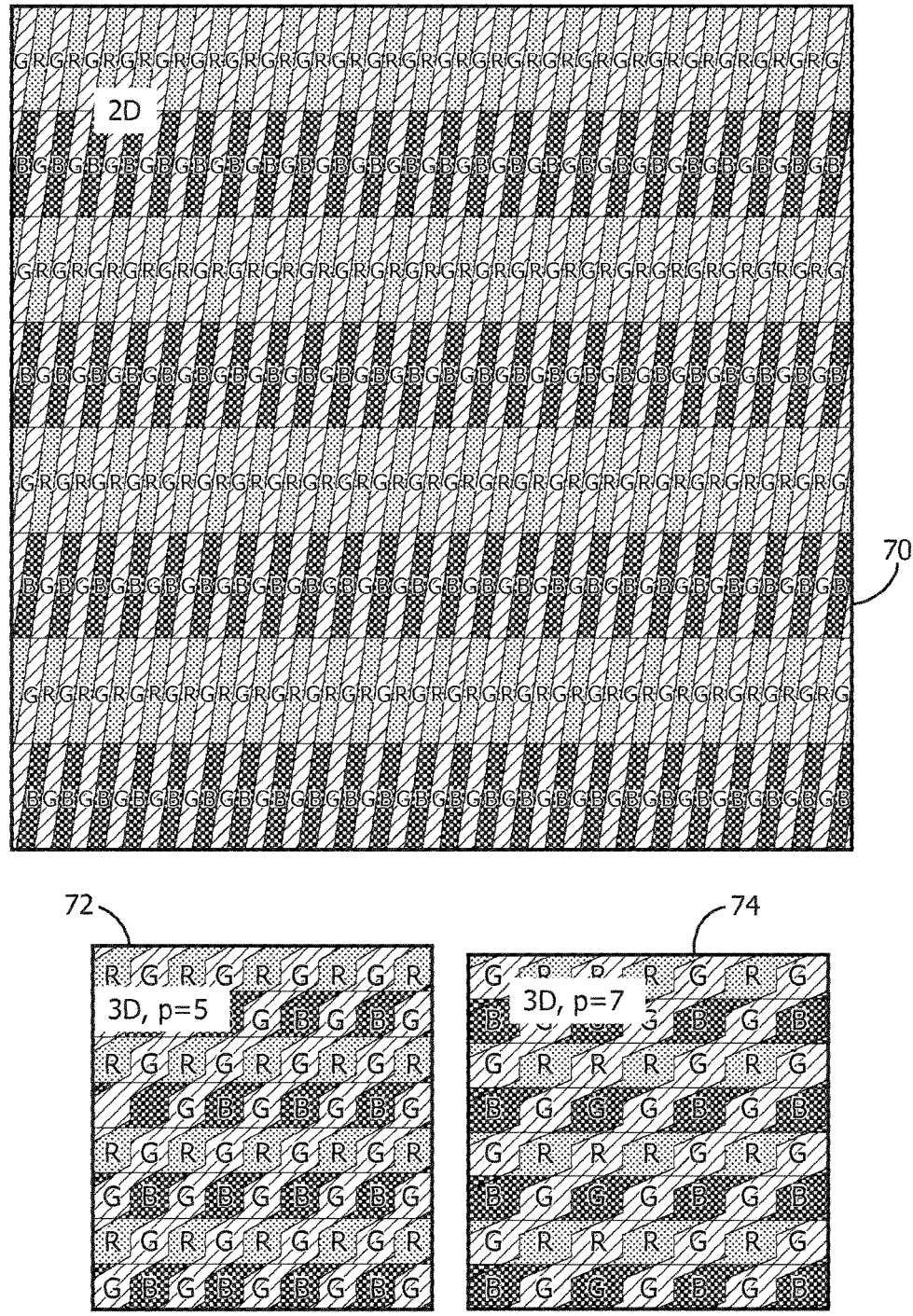
FIG. 7 shows a first set of detailed examples of display panel for use in the device of the invention.

FIG. 7 shows a first example. The slant s=⅙ and the sub-pixel aspect ratio is a=⅙. The native 2D display is shown as 70, and two examples of 3D sub-pixel configuration for different lenticular lens pitches are shown as 72 and 74.

The display has sub-pixels of the type shown in FIG. 6(a). A first row of sub-pixels has GR (green, red, green, red, etc.) sub-pixel groups, and a next row has BG (blue, green, blue, green etc.) sub-pixel groups. Thus, each row of sub-pixels uses only two colors. Two rows of sub-pixels are needed to form each 2D display pixel, which thus comprises four sub-pixels. In this example, the four sub-pixels are R,G,G,B.

The 2D sub-pixels centres form a rectangular grid. Thus, the columns of pixels can be taken to be parallel to the display sides, rather than along the slant direction. Taking the columns as parallel to the display area sides, there are two types of column. One has RG sub-pixels, and the other has GB sub-pixels.

The 3D pixel layout 72 corresponds to a lenticular pitch of 5 (i.e. the lens pitch is 5 w).

The 3D pixel layout 74 corresponds to a lenticular pitch of 7 (i.e. the lens pitch is 7 w).

It can be seen that the 3D pixels are formed as essentially square arrays of four color sub-pixels.

Figure 8:
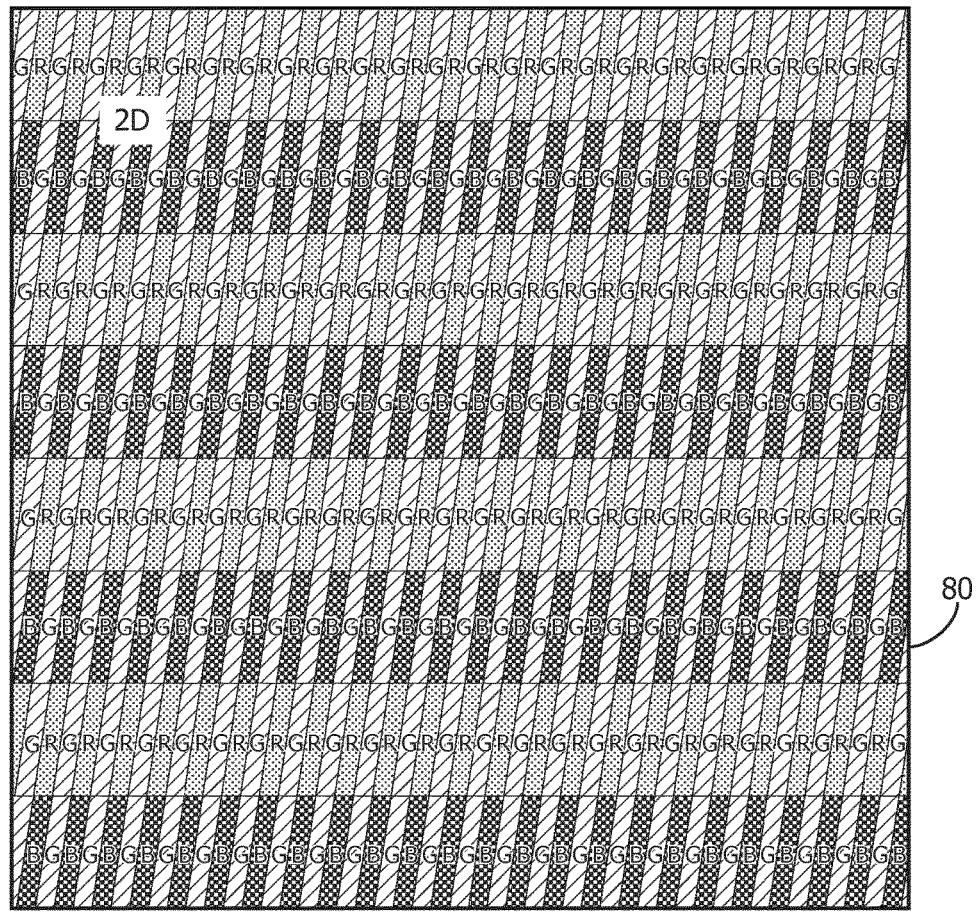
FIG. 8 shows a second set of detailed examples of display panel for use in the device of the invention.
Figure 8:
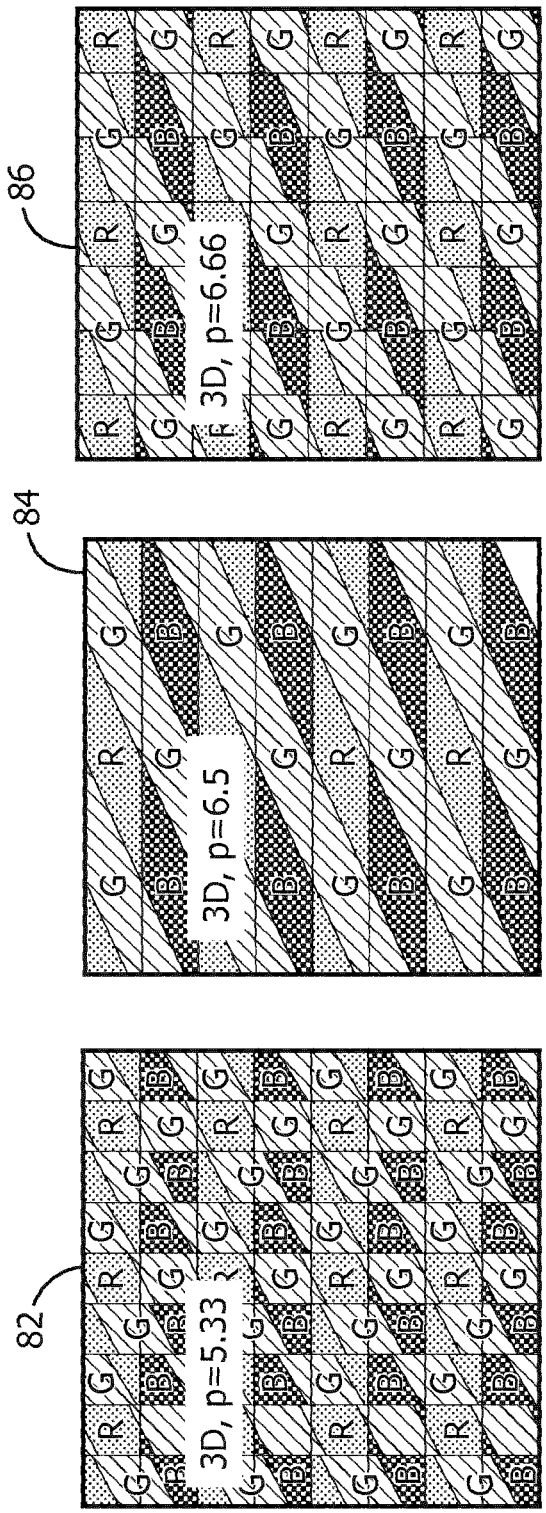

FIG. 8 shows a second example. The slant is again s=⅙ and the sub-pixel aspect ratio is a=⅙. The native 2D display is shown as 80, and is the same as in FIG. 7. Three examples of 3D sub-pixel configuration for different lenticular lens pitches are shown as 82, 84 and 86. These are all the designs with non-integer (fractional) lens pitch values, which enable additional reduction in banding.

The 3D pixel layout 82 corresponds to a lenticular pitch of 5+⅓.

The 3D pixel layout 84 corresponds to a lenticular pitch of 6+½.

The 3D pixel layout 86 corresponds to a lenticular pitch of 6+⅔.

The 3D pixels are still close to square shape but the areas having the same colors may have a contribution from different 2D sub-pixels.

The two examples above have the slanted sub-pixels of the 2D display all with the same slant direction.

An alternative is to provide alternate rows of sub-pixels with opposite slant directions with respect to the elongate element direction.

Figure 9:
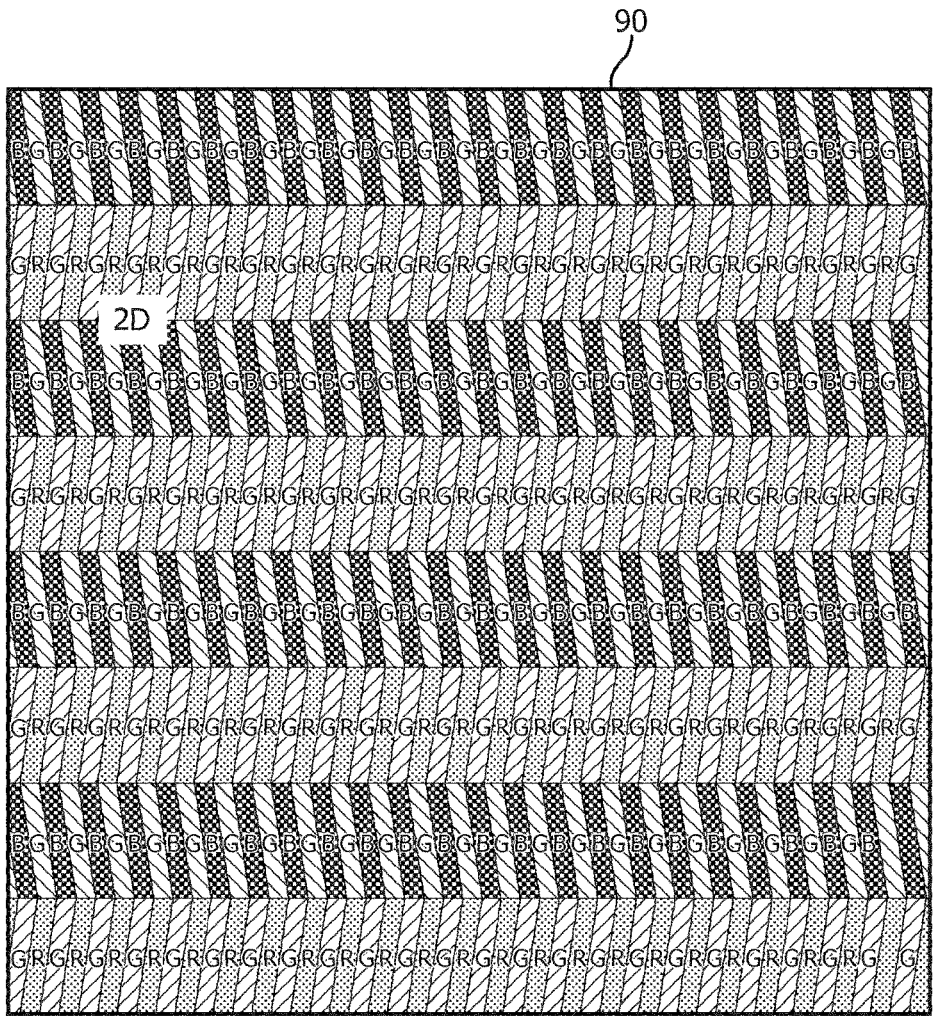
FIG. 9 shows a third detailed example of display panel for use in the device of the invention.
Figure 9:
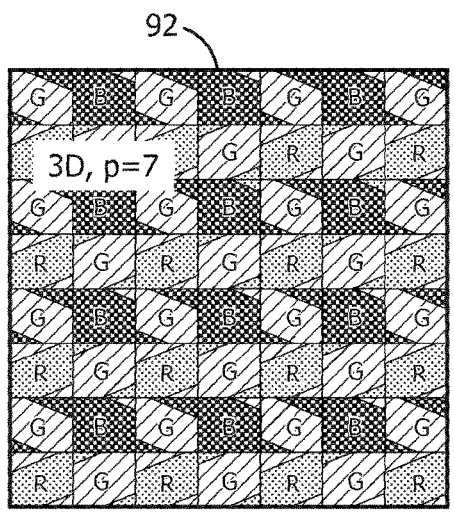

FIG. 9 shows a third example with a native 2D display 90 with this design. The rows and columns are more clearly parallel to the display area boundary, but the display sub-pixels are individually slanted. There are again two types of rows (and columns). One has GB sub-pixel groups, and the other has RG sub-pixel groups.

The sub-pixel aspect ratio a=1/6 and the slant s=±1/6. The 3D sub-pixel layout for lenticular pitch 7 is shown as 92.

Figure 10:
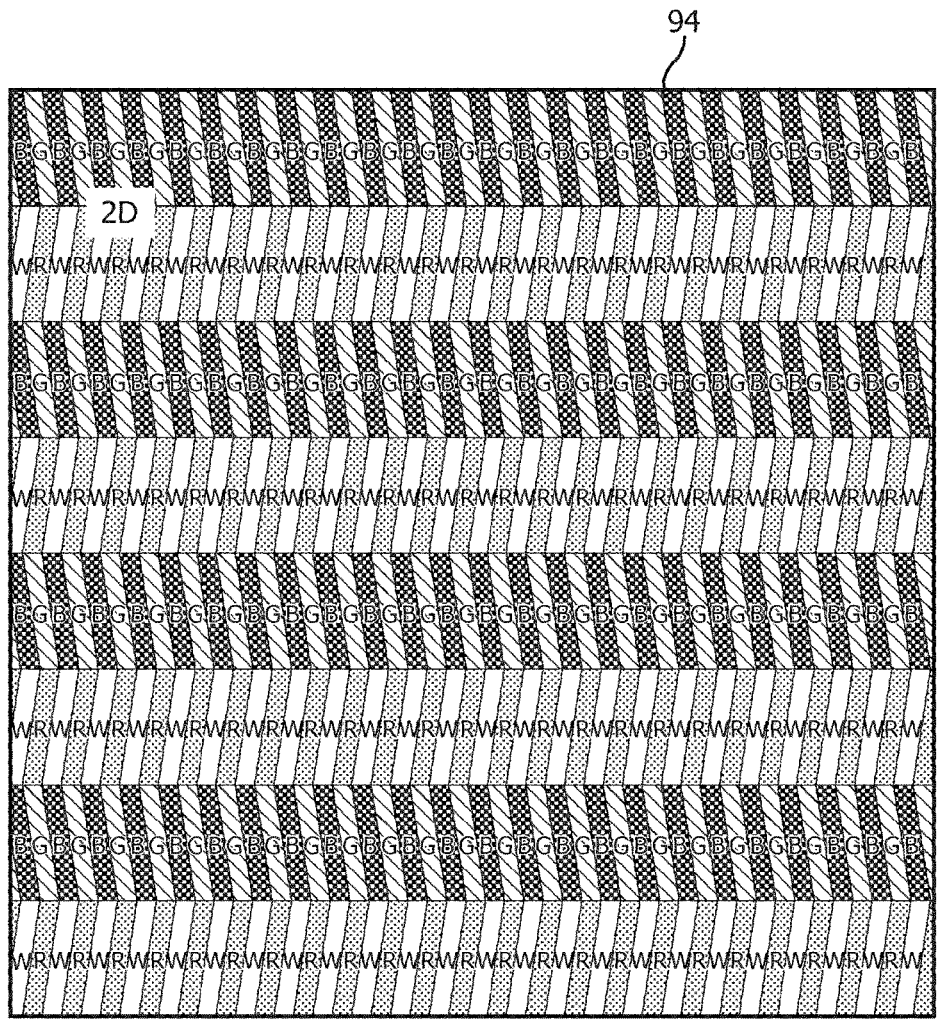
FIG. 10 shows a fourth detailed example of display panel for use in the device of the invention.
Figure 10:
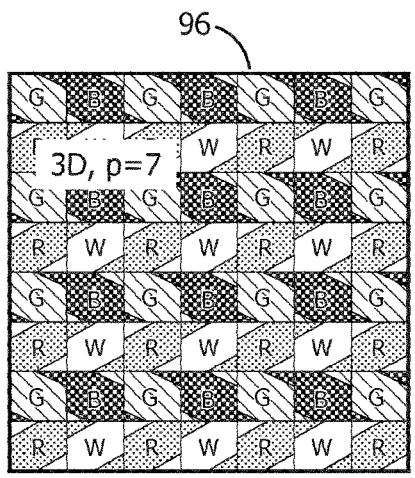

FIG. 10 shows a fourth example with a native 2D display 94 with this design. The rows and columns are thus globally parallel to the display area boundary, but the display sub-pixels are individually slanted with slant direction changing in each of the next row. This example has RGBW pixels, formed as a GB row and a RW row. There are two types of column. One has GR sub-pixel groups, and the other has BW sub-pixel groups.

The sub-pixel aspect ratio a=1/6 and the slant s=±1/6. The 3D sub-pixel layout for lenticular pitch 7 is shown as 96.

Figure 11:
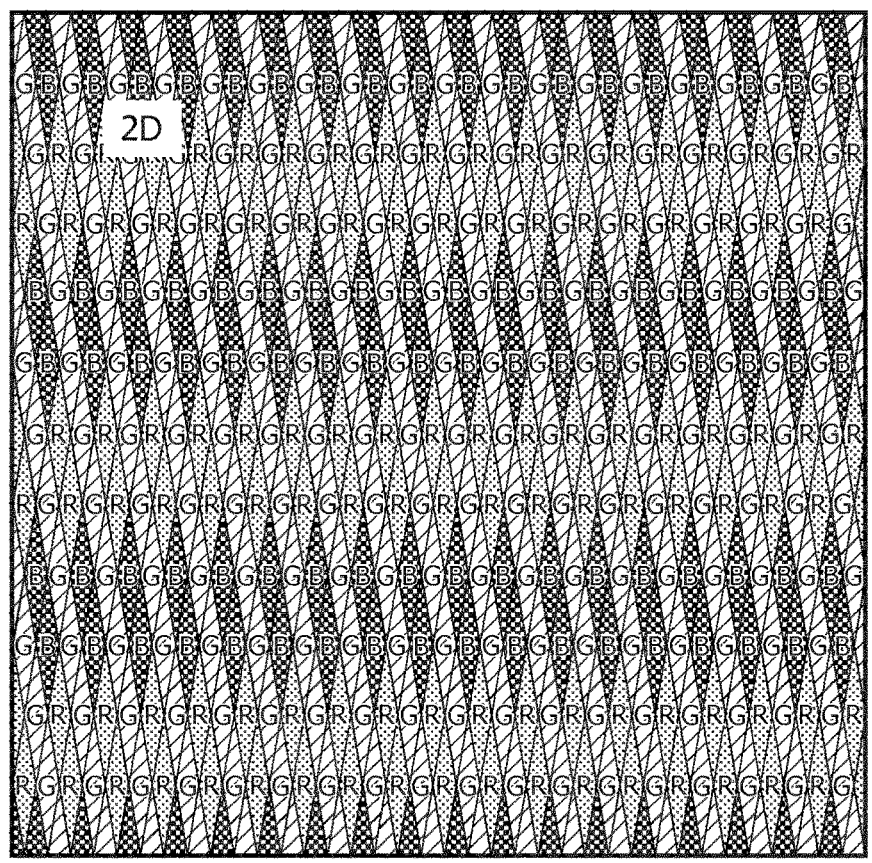
FIG. 11 shows a fifth detailed example of display panel for use in the device of the invention.
Figure 11:
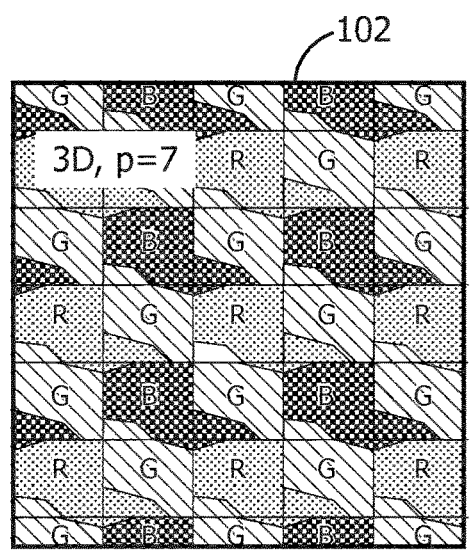

FIG. 11 shows a fifth example in which the sub-pixels are rhombus shapes as in FIG. 6(b). However the rows are arranged in identical pairs (although staggered by half a sub-pixel pitch in the row direction). The adjacent rows are all individually addressable.

The 2D panel is shown as 100 and the 3D image as 102. The sub-pixel aspect ratio a=1/6 and the slant s=±1/6. This design has a lenticular pitch of 7. This design results in a uniform color distribution for the 3D panel.

In this design, the sub-pixel colors of the native 2D display are spread over a repeating sequence of 4 rows. The elements of the first and the second rows have the same sub-pixel color groups (e.g. BG) and the elements of the third and fourth rows have the same sub-pixel color groups as each other (e.g. GR) but with at least one other color component not used in the first and second rows.

The 2D sub-pixels form a diamond grid. The columns of pixels can again be taken to be parallel to the display sides. Taking the columns as parallel to the display area sides, there are two types of column in the native 2D display. One has GR sub-pixels, and the other has BG sub-pixels.

The diamond grid means that centres of the display sub-pixels in each of the consecutive rows are shifted by a fraction of the sub-pixel pitch in the row direction and a fraction of the sub-pixel pitch in the column direction. The fractional shift of the display elements in consecutive rows is (approximately) half of the sub-pixel pitch in the row direction and (approximately) half of sub-pixel pitch in the column direction.

This means that the ordering of the color of display sub-pixels is such that along the lines connecting the centres of display elements in column and row directions the color sequence of display elements is repeating after each second element. The respective shift of the centres of the sub-pixels in the adjacent rows by a fraction of sub-pixel pitch results in the row pattern repeating every four rows.

The 3D sub-pixels form a near-square grid of near-square sub-pixels.

Figure 12:
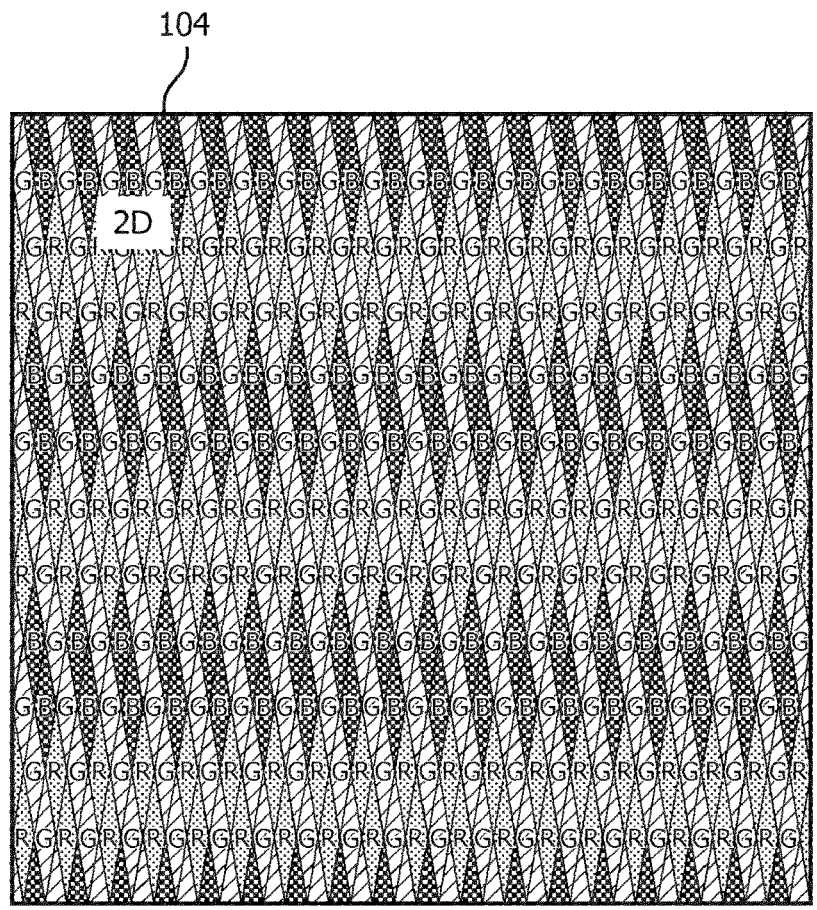
FIG. 12 shows a sixth detailed example of display panel for use in the device of the invention.
Figure 12:
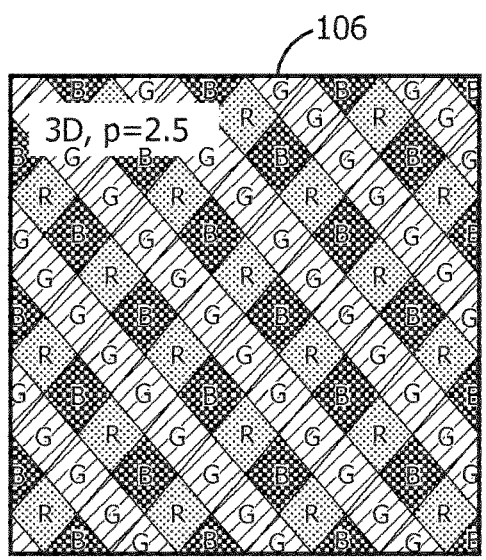

FIG. 12 shows a sixth example in which the sub-pixels are again rhombus shapes as in FIG. 6(b). The 2D panel is shown as 104 and the 3D image as 106. The sub-pixel aspect ratio a=1/6 and the slant s=±1/6. This design has a lenticular pitch of 2.5.

The sub-pixel colors of the native 2D display are spread over a repeating sequence of four rows, which form GR, GB, RG and BG sub-pixel groups along the row direction. The sub-pixel color pattern changes every row.

As in the example of FIG. 11, the centres of the display elements in each of the consecutive rows are then shifted by a half sub-pixel pitch in the row direction and a half sub-pixel pitch in the column direction. There are four types of column in the native 2D display, with GR, GB, RG and BG sub-pixel groups.

The 3D sub-pixels form a diamond grid of near-diamond shaped sub-pixels.

Figure 13:
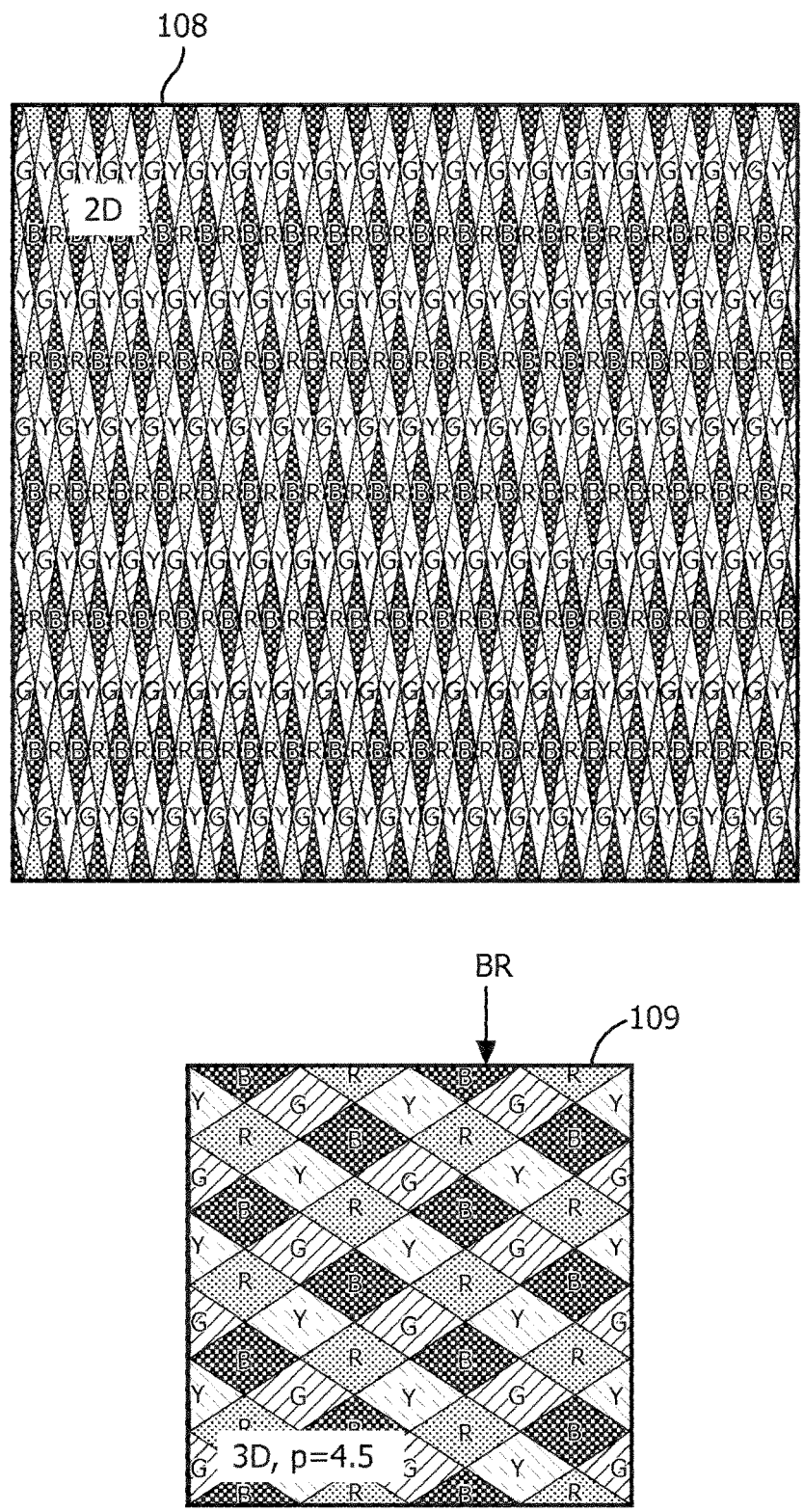
FIG. 13 shows a seventh detailed example of display panel for use in the device of the invention.

FIG. 13 shows a seventh example in which the sub-pixels are again rhombus shapes as in FIG. 6(b). The 2D panel is shown as 108 and the 3D image as 109. The sub-pixel aspect ratio a=1/6 and the slant s=±1/6. This design has a lenticular pitch of 4.5.

The sub-pixel colors of the native 2D display are spread over a repeating sequence of four rows, which form RB, YG, BR and GY sub-pixel groups. The display pixels comprise RGBY 3D sub-pixels formed over two rows.

There four types of column in the native 2D display, with RB, YG, BR and GY sub-pixel groups.

In this example, the color components of strong visibility are arranged in vertical (column direction) and horizontal (row direction) lines in the 3D display, in particular the YG columns and rows as shown in FIG. 13.

The 3D sub-pixels form a diamond grid of near-diamond shaped sub-pixels.

The arrangements of FIGS. 11 to 13 can be generalised. The color sequence of display elements along the lines connecting the centres of display elements in the column and row directions can be By or xR where x and y (possibly x=y) can be color components that have a strong visibility such as Green, Yellow, White or Cyan. Alternatively, the color sequence of display elements along the lines connecting the centres of display elements in the row and column directions can be xy and RB. The examples above have rows repeating after four rows because the By and xR patterns are inverted before the pattern repeats.

As explained above, the pitch of the lenticulars is selected close to the value 1/a, for example pitch P of the lenses expressed in units of the width of the display sub-pixels, can satisfy: (1/a)−1<=P<=(1/a)+1. This applies to the examples of FIGS. 7 to 10.

In the examples of FIGS. 11 to 13, with diamond/hexagonal grids, the preferable pitch should be close to a value 1/Ka (rather than 1/a), where factor K will be dependent on the specific color ordering in the grid. For the embodiment shown in FIG. 11, the color pattern is the same for two consecutive rows, and the factor K=1. In the column direction the color pattern repeats after four columns, and even pitch values are excluded. An example of a good design with a pitch of 7 sub-pixels is shown for a=⅙, but also other odd integer and fractional pitch values are possible.

For the embodiments of FIGS. 12 and 13 color patterns are different in the consecutive rows and K=2. An example of a good design with a pitch of 2.5 sub-pixels is shown in FIG. 12 with a=⅙, but also other fractional pitch values are possible.

Thus, more generally, some examples satisfy (1/Ka)−1<=P<=(1/Ka)+1, where K is an integer multiple, which will typically be 1 or 2.

In the examples of FIGS. 11 to 13, because the native 2D pixel grid is organized such that even and odd rows are offset by half a pixel width, this makes it straightforward to engineer away all banding. It simultaneously allows the angular crosstalk profile of a phase to be designed. Ideally, a pixel is shaped such that the profile in x-direction has high bandwidth in frequency domain.

Figure 14:
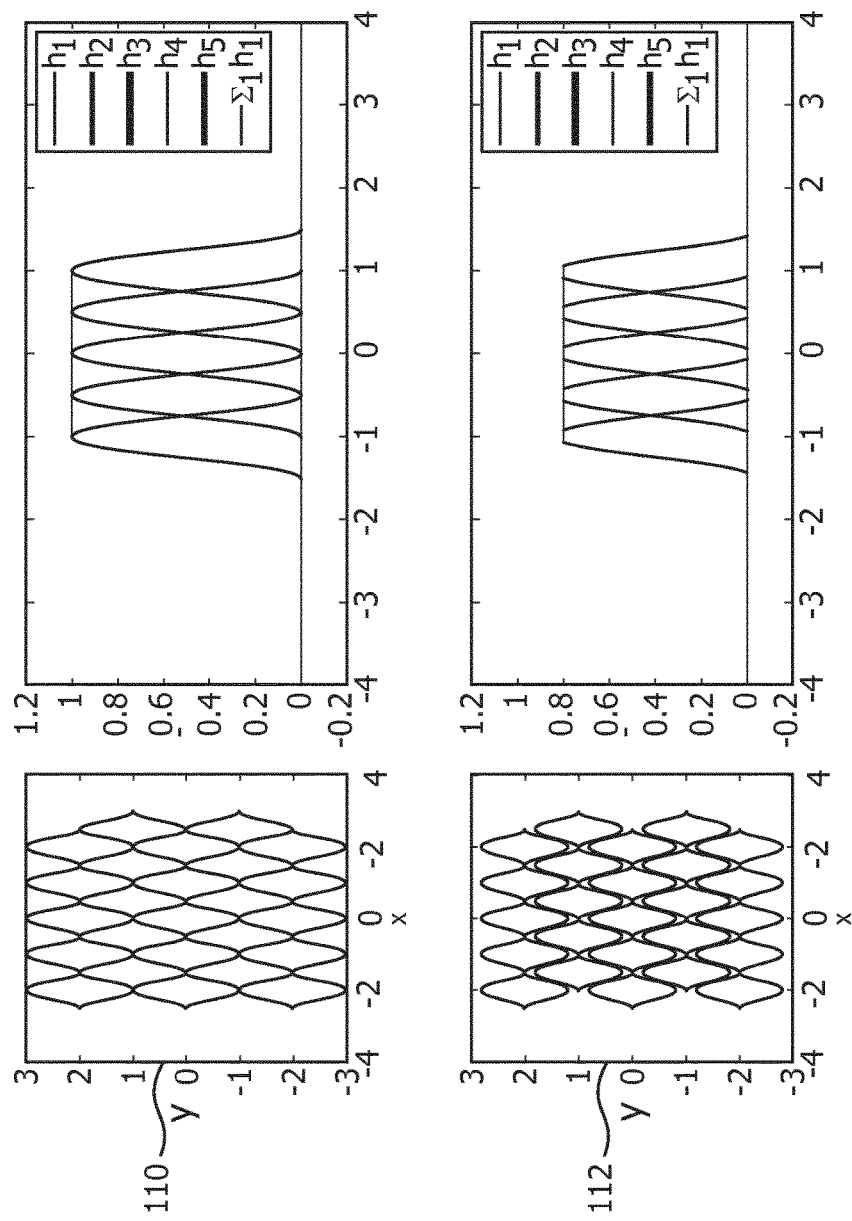
FIG. 14 shows different sub-pixel shapes and their optical performance.

This is illustrated in FIG. 14 where area 110 shows a shape designed to have a Hann function profile (e.g. raised cosine):

$$h: x \to \begin{cases} \cos^2 \pi x & -\frac{1}{2} \le x < \frac{1}{2} \\ 0 \end{cases}$$

A modified version is shown in area 112 that has a (more or less) rectangular mid-section to allow for black matrix area between pixels. There is an 80% aperture in this design.

The images on the right show that for both example shapes, contributions of consecutive sub-pixel groups with different phases count up to constant intensity, thus preventing banding in autostereoscopic display device.

In FIG. 14, the x-axis is the horizontal position in units of sub-pixel column pitch. The y-axis of the left two plots is also in units of sub-pixel column pitch. The y-axis of the right two plots is normalized intensity where 1 is for having 100% aperture when integrating over y. For these shapes, 100% corresponds to a pixel height of 2.

In practice a shape can be optimized by a combination of computer simulation and trial and error, taking into account various requirements such as the positions of vias.

Usually sub-pixels having different relative position with respect to an individual lenticular lens contribute to the views in different angular directions. Both the sub-pixel layout and lenticular lens layout has a periodicity, and the number of phases is the minimum number of subpixels which are positioned differently with respect to the periodic lenticular lens. As even and odd rows are shifted, the number of phases M≥2N (where N is the number of views) but by making the pitch a non-integral number of pixels, the number of phases can be further increased. It is preferred that the pitch expressed in horizontal pixel pitch is a fraction p=c/d with d>2 and c and d being natural numbers. The number of phases (M) is $$M = p \cdot lcm(d, 2).$$

where lcm signifies the lowest common multiple and p is lens pitch in the units of sub-pixels. The offset of half a pixel width gives rise to a hexagonal grid of sub-pixel centre positions, which repeats over two rows. With a pattern which repeats over more than two rows, it is difficult to simultaneously control banding and pixel shape, except when controlled per row.

Figure 15:
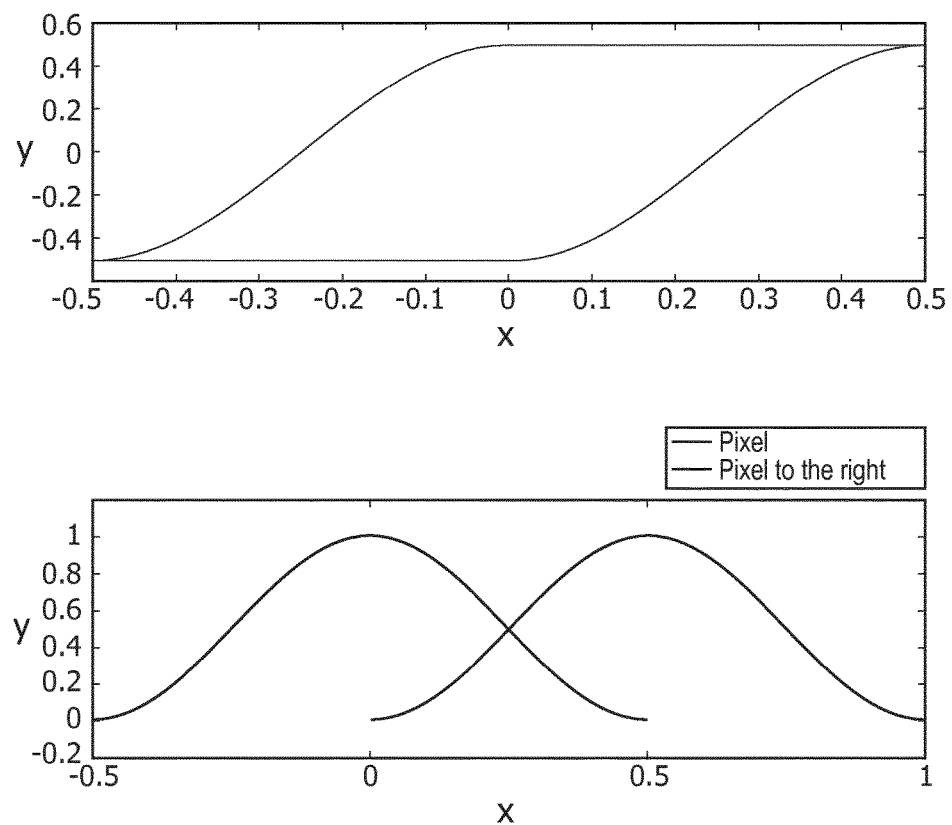
FIG. 15 shows another possible sub-pixel shapes and its intensity profile with an optical crosstalk between the two adjacent sub-pixels.

FIG. 15 shows in the top diagram a pixel shape which is designed to control the banding based on the individual row. The pixel shape again has a Hann profile in the x-direction (the sub-pixel width direction). The lower plot shows the crosstalk profile for two adjacent pixels.

In FIG. 15, the x-axis is again horizontal position in units of sub-pixel column pitch. The y-axis for the top plot is also in units of sub-pixel column pitch. The y-axis for the bottom plot is the normalized intensity.

For the examples above, the pitch value defines how many individually addressable sub-pixels per row will be situated under an individual lenticular lens and hence the number of independently projected 3D views. This will preferably result in designs with elongated pixels and their slanting at small acute angles with respect to the lens direction.

These designs of 2D pixel panel and combination of parameters enable several advantages over existing solutions of panel pixel layout for autostereoscopic displays:

3D sub-pixels can be made to be close to a square shape;

Rectangular grid of 3D sub-pixels—which allows drawing horizontal and vertical lines in 3D mode without aliasing;

Green 3D sub-pixels can be aligned on a diamond grid—with equal intensity and color distribution;

Uniform color distribution for all color components in 3D, which allows reduction of color-related banding effects;

Non-slanted lenticulars lenses offer easier and potentially more cost-effective manufacturing option, with easier lens alignment on the 2D panel; and Slanted pixels and partial overlap between them in column direction reduces the amount of black matrix projected in certain directions—giving a reduction of banding.

Figure 16:
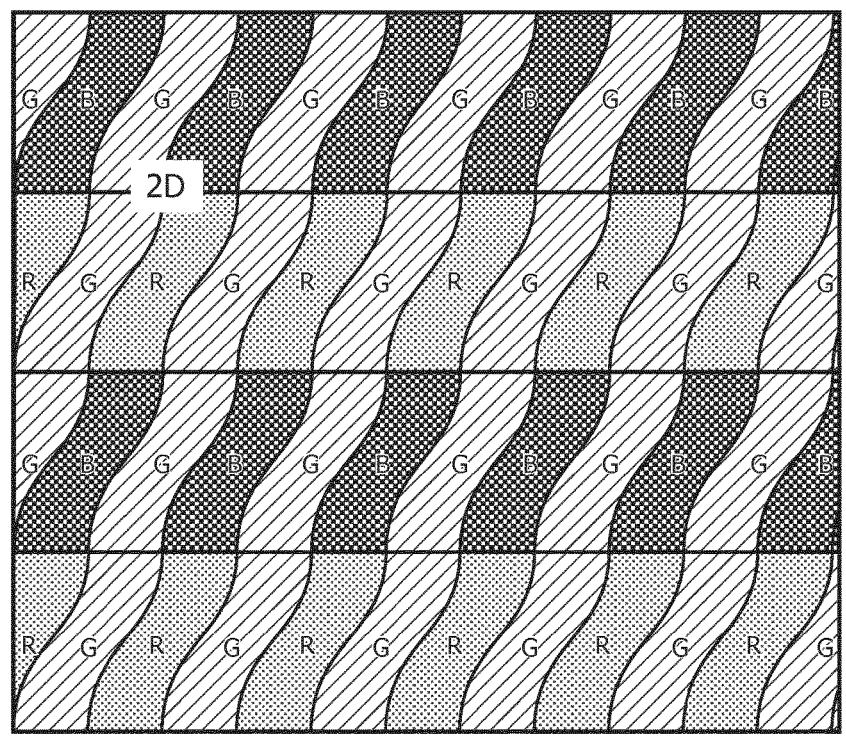
FIG. 16 shows an eighth detailed example of display panel for use in the device of the invention.

The 2D display sub-pixels do not necessary have to be exactly a parallelogram shape or other regular shape. The edges of the sub-pixels may be curved as shown in FIG. 16 such that the adjacent pixels penetrated into each other. This will result in further reduced banding. However, the sides are still slanted as explained above.

This is the intended meaning of sides which are "generally" slanted. This can be understood as requiring a replacement of the side profile with a line of best fit, and this line of best fit then has the defined slant conditions.

In the examples above, each row of 2D sub-pixels has exactly least two different color sub-pixels.

By making use of consecutive rows, an advantage is to have an equal spread of colors in the row and column direction, finally having smaller full-color 3D pixel and dividing the decrease of resolution both in the row and column directions.

The color sub-pixels in the two consecutive rows are different, so that the first row contains display elements of two different colors, and the next row contains display elements of two different colors wherein the set of color components between these rows is not identical.

The RG and GB designs given above are only examples. For example, this can be generalised to Rx color components in the one row and yB color components in the next row where x and y (possibly x=y) can be color components that have a strong visibility such as Green, Yellow, White or Cyan. The colors alternate along the rows, i.e. one row is formed as Rx sub-pixel groups and the other is formed as yB sub-pixel groups. This applies to both the version with parallelogram shaped sub-pixels with horizontal top and bottom, and the rhombus versions.

In some of the examples above, the number of green sub-pixels in the 2D display is twice the number of red and blue sub-pixels. This enhances the perceived impression of the 3D-resolution.

The examples above include two different color sub-pixels per row. More generally, each row of sub-pixels can include sub-pixels of at least two colors, and for at least two adjacent rows the sub-pixels in the same columns do not all match in color and the sub-pixel color pattern for the rows repeats every two or more rows. Thus, the rows do not repeat row-by-row but repeat in groups of two or more rows.

Thus, another set of examples makes use of three or more color sub-pixels in each row, but with the same slanted-edge sub-pixel shape for the native 2D display panel. These examples are shown in FIGS. 17 to 28.

FIG. 17 shows an example in which each row has groups of R,G and B sub-pixels, but the order of color components in the corresponding group (i.e. aligned in the column direction) of the next row is obtained by cyclic permutation of the colors compared to current row. This example has the row pattern repeating every three rows, hence three rows are identified with color labels. This design enables thin vertical and horizontal lines to be formed, but the pixels of each primary color in the 3D display are not formed as a regular rectangular or diamond grid.

The slant s and aspect ratio are each 1/3 and the 3D sub-pixel layout is shown for a pitch of 3.5 and for a pitch of 4.0.

The color ordering in row and column directions can be either RGB (row) and RGB (column) or RGB (row) and RBG (column) as is shown in FIG. 17.

In the example shown, the first row has an RGB pattern, the second row has row a BRG pattern and the third row a GBR pattern. Another example is the first row with a RGB pattern, the second row with a GBR pattern and the third row with a BRG pattern.

Figure 18:
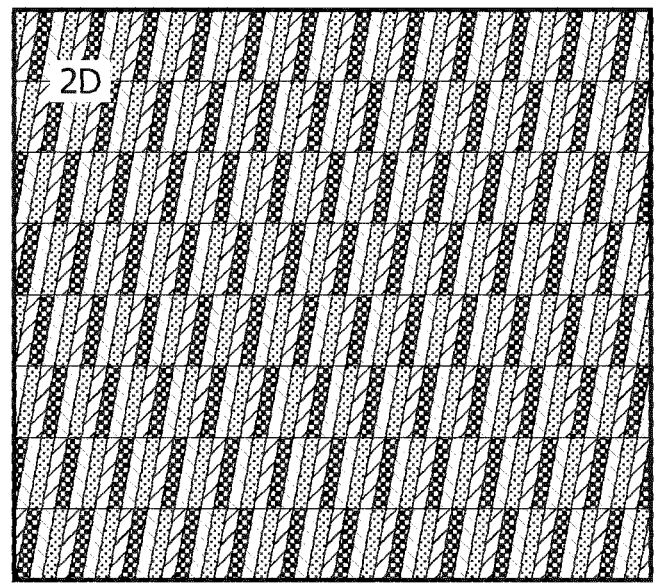
FIG. 18 shows a tenth detailed example of display panel for use in the device of the invention.
Figure 18:
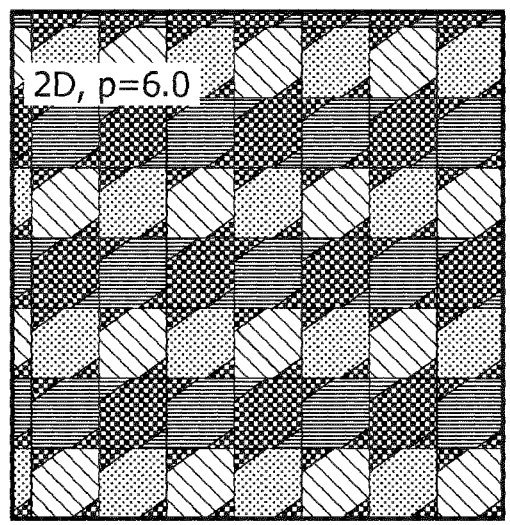

FIG. 18 shows an example for the case of four primary components, and in which the row pattern repeats every four rows. The color ordering in the row and column directions can be RxBy (row) and RxBy (column) or RxBy (row) and RyBx (column).

As in the examples above, x and y (possibly x=y) can be color components that have a strong visibility such as Green, Yellow, White or Cyan. The order of color sub-pixels can be changing by cyclic permutation.

In the specific example of FIG. 18, the first row has an RGBW pattern, the second row has a WRGB pattern, the third row has a BWRG pattern and the fourth row has a GBWR pattern. The components of each color in the 3D image are distributed on a diamond-like grid.

In the example of FIG. 18, slant s and aspect ratio are each 1/6 and the 3D sub-pixel layout is shown for a pitch of 6.0.

In the example of FIG. 18, the row pattern repeats every four rows, so that each group of four sub-pixels is fully cyclically rotated.

Instead, the pattern may repeat after a number of rows that is less than the number of different color sub-pixels.

FIGS. 19 to 22 show examples based on three different color sub-pixels per row, but the row pattern repeating every two rows. FIGS. 23 to 26 show examples based on four different color sub-pixels per row, but the row pattern repeating every two rows. The color sequence of display elements in the group thus changes each second row. These arrangements enable rectangular grids of 3D sub-pixels to be formed.

Figure 19:
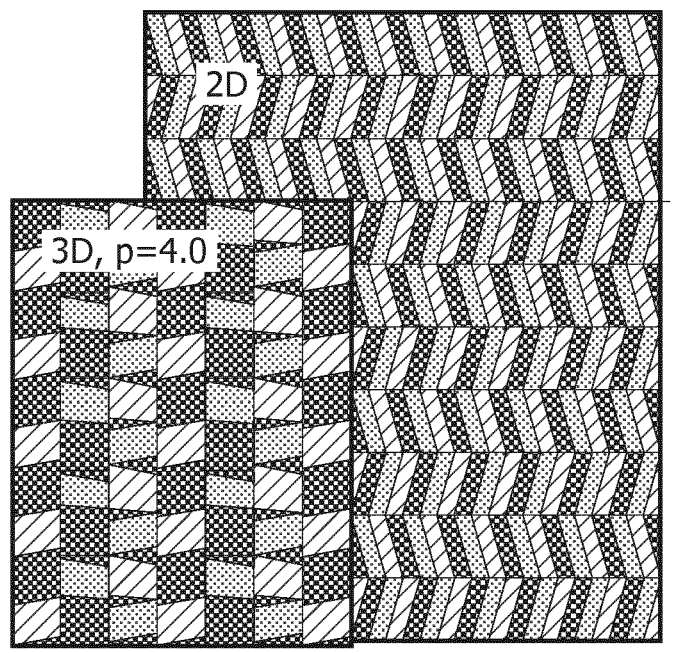
FIG. 19 shows an eleventh detailed example of display panel for use in the device of the invention.

FIG. 19 shows a design with slant s and aspect ratio each 1/3 and the 3D sub-pixel layout is shown for a pitch of 4.0. As in some examples above, the slant alternates in direction between adjacent rows.

The order of color sub-pixels in the next row is obtained by cyclic permutation of the color sub-pixels of the group in the current row. The example of FIG. 19 has odd rows patterned as RGB groups and even rows patterned as BRG groups.

Figure 20:
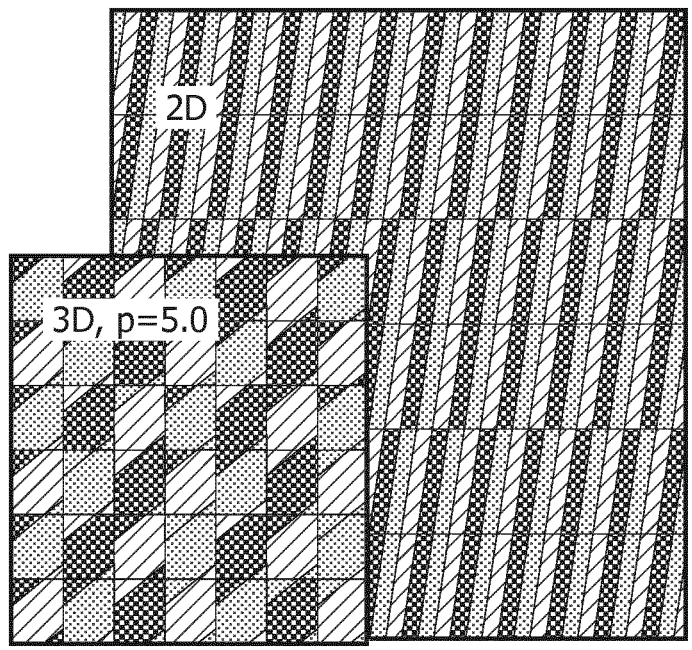
FIG. 20 shows a twelfth detailed example of display panel for use in the device of the invention.

FIG. 20 shows a design with slant s and aspect ratio each 1/6 and the 3D sub-pixel layout is shown for a pitch of 5.0. The slant has the same direction in all rows.

The example of FIG. 20 has odd rows patterned as RGB groups and even rows patterned as GBR groups.

Figure 21:
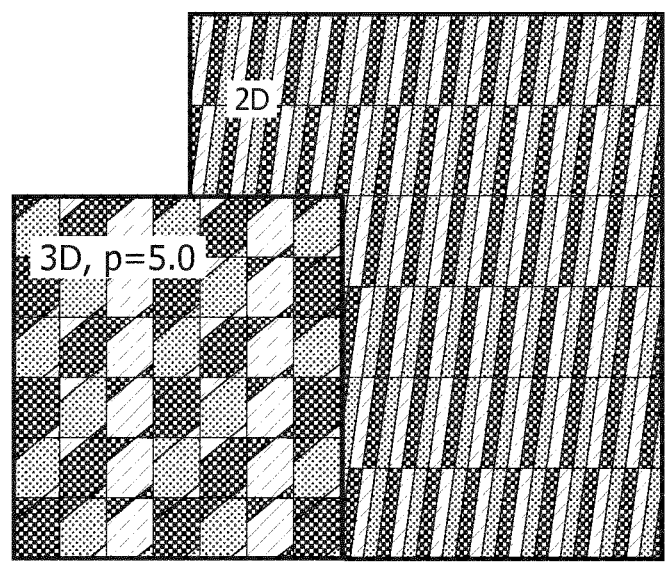
FIG. 21 shows a thirteenth detailed example of display panel for use in the device of the invention.

FIG. 21 shows a design with slant s and aspect ratio each 1/6 and the 3D sub-pixel layout is shown for a pitch of 5.0. The slant has the same direction in all rows.

The example of FIG. 21 has odd rows patterned as RGB groups and even rows patterned as BGR groups. In this case, the order of color sub-pixels in the next row is obtained by pair-wise permutation of color sub-pixels in the current row. This design gives green pixels aligned in a column direction.

Figure 22:
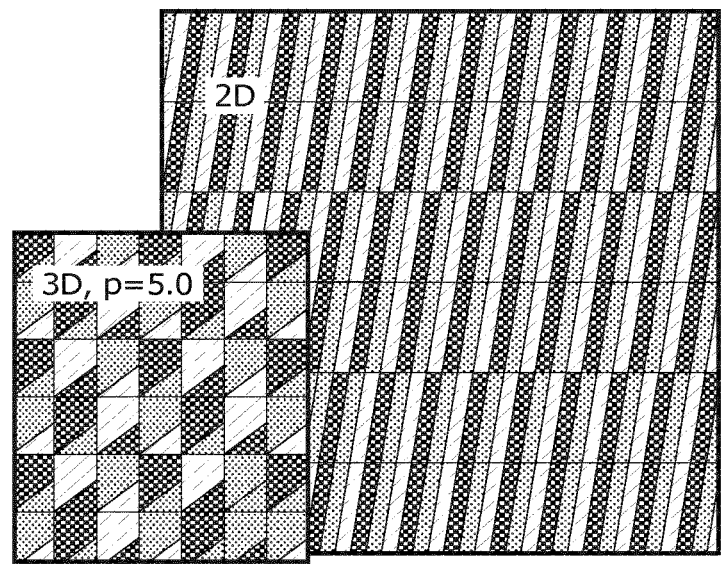
FIG. 22 shows a fourteenth detailed example of display panel for use in the device of the invention.

FIG. 22 shows a modified view of 3D panel with the same 2D panel layout as on FIG. 20 with a shift of the panel with respect to the lens array. This is to show the change in visibility of the 3D sub-pixels. The 3D pattern and color distribution remains almost unaltered, but other sub-pixels under the lens array become at least partially visible.

The rows can instead have groups of sub-pixels of four sub-pixels in the row direction (either with four different colors or with three different colors and one repeated twice per group).

FIGS. 23 to 26 show examples all with groups of four color sub-pixels which repeat in the rows. Examples are given with four different colors as well as with four individually addressable color pixels in the group but having only three colors. By way of example, these versions have alternating slant directions in alternating rows and also the row pattern repeats every two rows. In each case, the slant s and aspect ratio are each 1/6.

Figure 23:
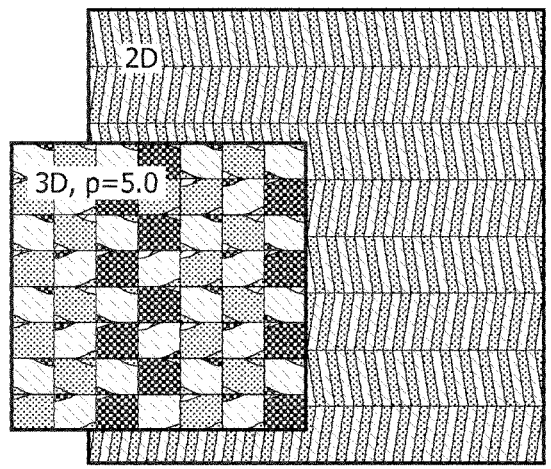
FIG. 23 shows a fifteenth detailed example of display panel for use in the device of the invention.

FIG. 23 shows an example in which one row has RGBG sub-pixel groups and the next has GRGB sub-pixel groups. This 3D sub-pixel layout is shown for a pitch of 7.0.

With the row pattern repeating every two rows, the order of colors in the groups in the second row is obtained by a permutation (cyclic or multiple pair-wise) of the sub-pixel colors in the group in the first row.

One general example is RxBy groups for the first row and xRyB groups for the second row. FIG. 23 is an example of this with x=y=green.

Figure 24:
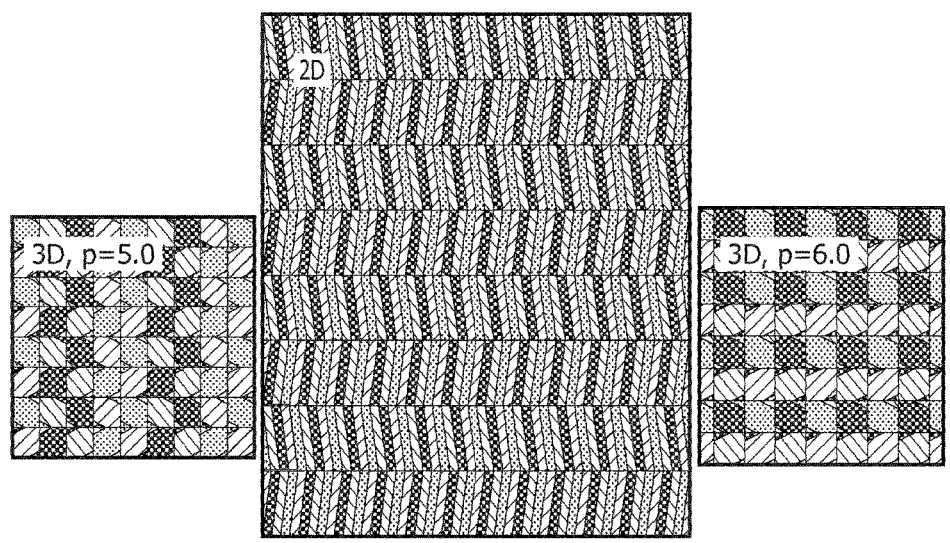
FIG. 24 shows a sixteenth set of detailed examples of display panel for use in the device of the invention.

Another general example is RxBy groups for the first row and yBxR groups for second row. FIG. 24 is an example of this, with x=yellow, y=green. The 3D sub-pixel layout is shown for a pitch of 5.0 and for a pitch of 6.0.

Figure 25:
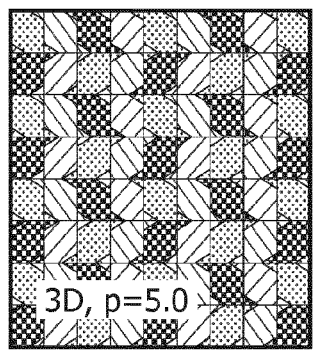
FIG. 25 shows a seventeenth detailed example of display panel for use in the device of the invention.
Figure 25:
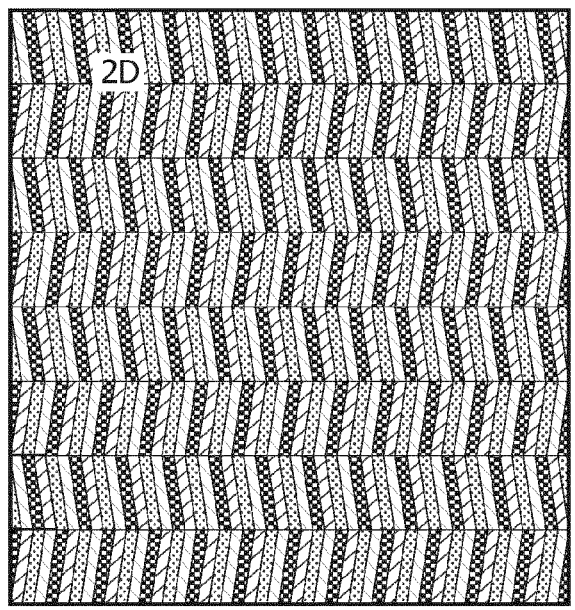

Another general example is RxBy pixel groups for the first row and ByRx pixel groups for the second row. FIG. 25 shows an example of this with x=yellow and y=green and the 3D sub-pixel layout is shown for a pitch of 5.0. This gives a diamond grid for the 3D sub-pixels of each primary color.

In the example of FIGS. 23 and 24, sub-pixels of colors of strong visibility are provided along meandering lines, whereas in FIG. 25 these pixels are aligned in a column direction (the YGYGYG . . . columns).

The alternation between sub-pixel colors in the groups can be based on obtaining the right half of a two-row group of eight element by a permutation (cyclic or multiple pairwise) of the left half, where permutations of shape and color components can be independently chosen. This gives a rectangular grid for each primary color 3D sub-pixel, but also the two high visibility colors x,y (i.e. green and yellow in this example) can form a diamond grid.

Figure 26:
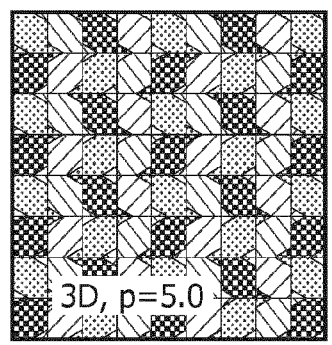
FIG. 26 shows an eighteenth detailed example of display panel for use in the device of the invention.
Figure 26:
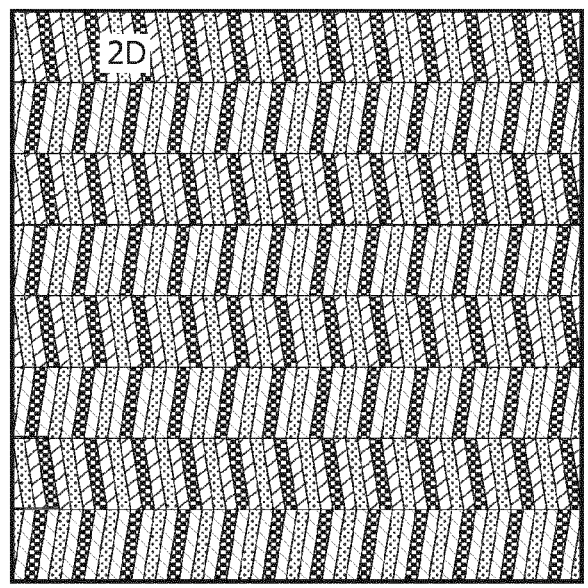

In one example, the sub-pixels are in RxBx groups for the first row and yByR groups for second row. FIG. 26 is an examples of this for x=green and y=yellow. The 3D sub-pixel layout is shown for a pitch of 5.0.

For the examples shown on FIGS. 25, 26 due to specific color ordering additionally even pitch values of view forming arrangements should be excluded, otherwise not all color components will contribute to a single view.

In preferred designs, the neighboring sub-pixels in the row and column direction can always have different color this is achieved in the designs above with the exception of FIG. 21.

Pixel groups with four pixels per row can repeat every three rows, instead of every two or four as in the examples above.

Figure 27:
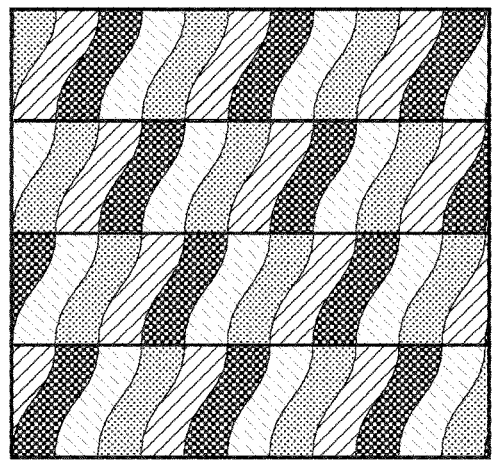
FIG. 27 shows a nineteenth detailed example of display panel for use in the device of the invention.

The curved edges shown in FIG. 16 can of course be applied to these examples as well, and FIG. 27 shows RGBW pixel groups which cycle fully so that the pattern repeats every four rows, and with curved edges.

FIG. 28 is used to show schematically the effect on the 3D sub-pixel layout when using a fractional lens pitch designs. FIG. 28(a) corresponds to FIG. 18 but with a pitch 5+½. FIG. 28(b) corresponds to FIG. 18 but with a pitch 5+⅔. FIG. 28(c) corresponds to FIG. 18 but with a pitch 6½. FIG. 28(d) corresponds to FIG. 19 but with a pitch 4⅓.

The examples above make use of parallelogram sub-pixel shapes or rhombic sub-pixel shapes. These shapes have a pair of sloped and parallel side edges. The sub-pixel shapes described above form a rectangular or diamond grid of sub-pixel centres.

Another alternative is triangular pixel shapes. These have slanted side edges but they are oppositely slanted instead of parallel. As discussed above in connection with rhombus sub-pixel shapes, in order to avoid banding, the pixel shape and the type of the pixel grid is chosen such that the sub-pixels overlap partially at least in one direction, which is parallel to the elongate direction of the view forming arrangement. By this is meant that a line in the lens (or barrier) direction can cross pixels from an adjacent pair of columns. In the case of rhombus and parallelograms, an example of fractional shift of ½ sub-pixel has been given.

Figure 29:
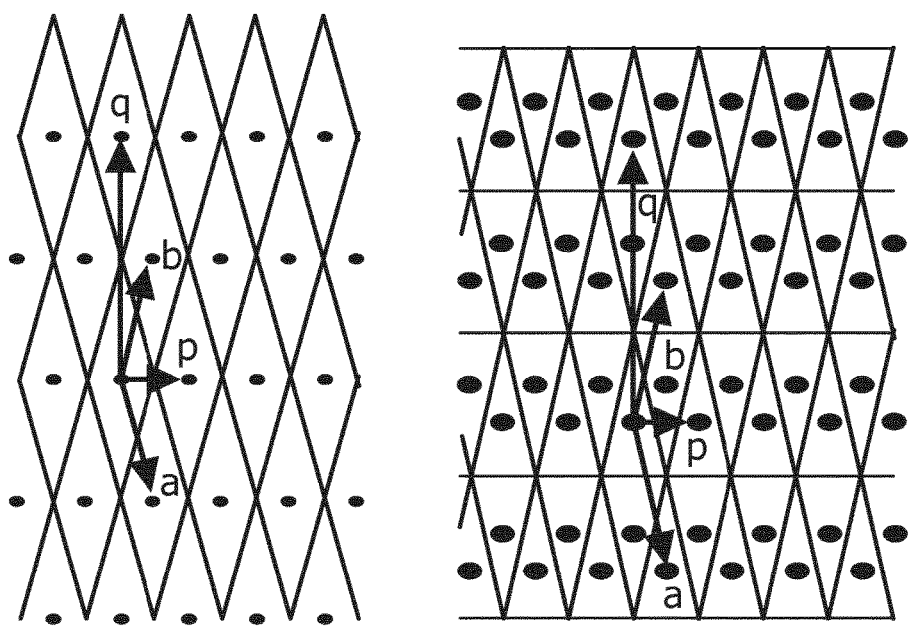
FIG. 29 shows how the grids comprising rhombic and triangular sub-pixels can be analysed using coordinate vectors.

FIG. 29 shows the tessellation of rhombus pixel shapes and also triangular sub-pixel shapes. In the case of rhombus shapes, the centers of the sub-pixels are arranged on a hexagonal grid (which can otherwise be seen as a diamond grid). The centers of display elements in each of the consecutive rows are shifted by half of sub-pixel pitch in the row direction and half of sub-pixel pitch in the column direction.

In the more complex case of a grid with triangular elements, the orientation of neighboring elements in the row also changes (they are rotated by 180 degrees). This grid can be described as two penetrating grids of triangular elements, the two grids being rotated by 180 degrees with respect to each other, with centers of the elements in each of the sub-pixel grids arranged on a diamond or hexagonal grid.

However, as a whole the sub-pixel area centers in each case are arranged in orthogonal rows and columns of color sub-pixels forming a grid of sub-pixel centres. In the case of the triangular sub-pixels, there are evenly spaced vertical columns, and horizontal rows. The rows are grouped in close together pairs. Thus, in the row direction, the sub-pixels of one row are shifted by half a sub-pixel pitch with respect to the adjacent rows, but in the column direction the shift is different.

The two-dimensional grid can be described by translation vectors, and the color distribution for the sub-pixels of the grid can be described by color change sequences in the directions along the translation vectors.

For the grid shown for the rhombus sub-pixels, the vectors a, b and p are the translation vectors between the nearest neighbors of the grid cells, vectors p and q are aligned with display row and column directions respectively, and their length corresponds to the sub-pixel pitch in the row and column directions. The grid can be described by two non-orthogonal unit vectors.

For example a coordinate system described by the vectors p (row direction) and vector a, pointing to the nearest neighbor element in the next row can be used. Alternatively vector b can be chosen instead of vector a, resulting in the similar pixel structure, but mirror-imaged relative to the horizontal plane.

Figure 30:
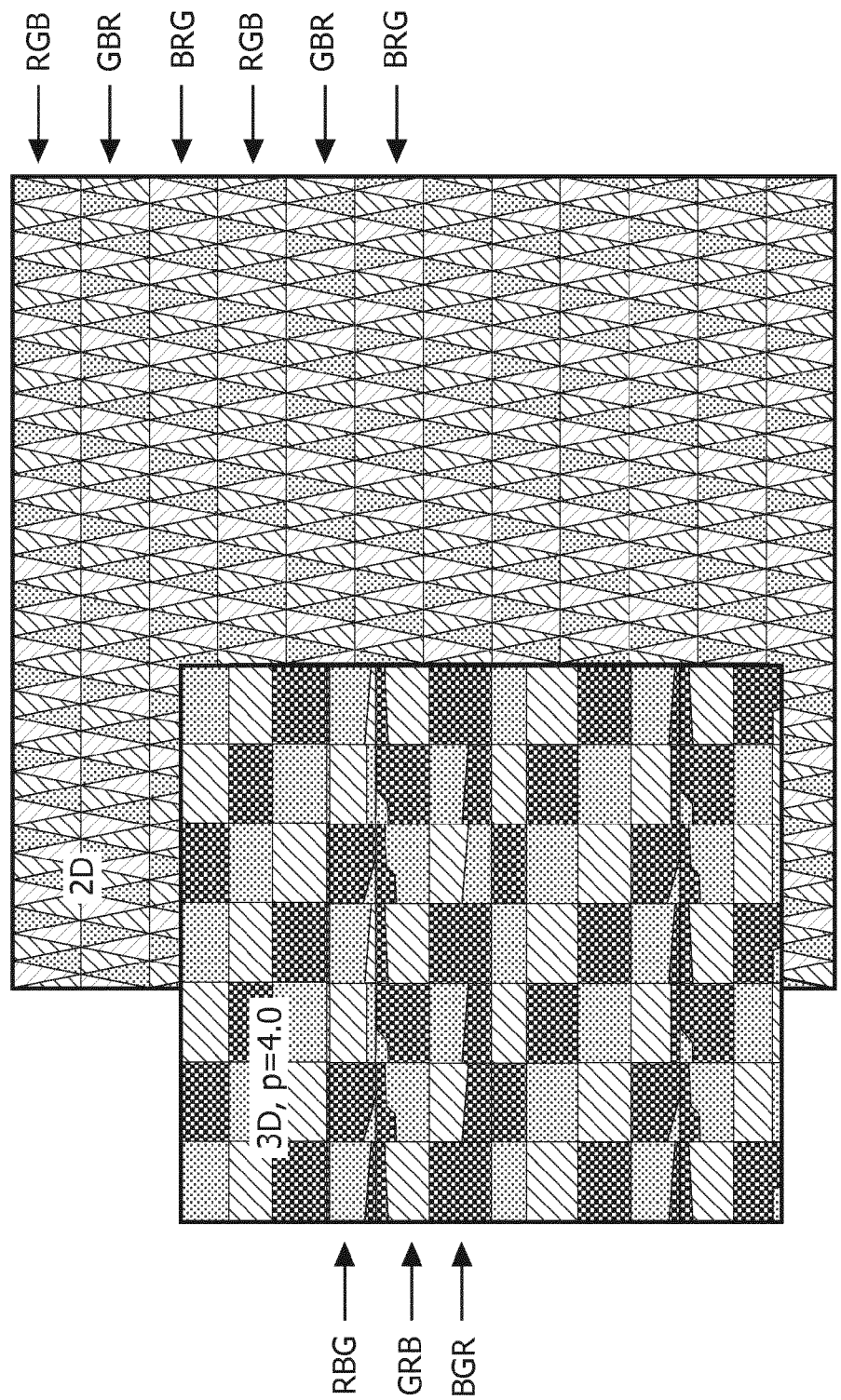
FIG. 30 shows a twentieth detailed example of display panel for use in the device of the invention.

FIG. 30 shows an example with triangular pixels, and shows the 2D pixel layout and the 3D sub-pixel layout for pitch 4.0. Each row has three color sub-pixels. The interleaved triangles of opposite orientation can together be considered to be one row, or else one row can be considered to comprise only triangles of the same orientation.

Taking one row to be a set of triangles of both orientations, then the pattern repeats every six rows as marked on FIG. 30 (the repeat being defines as when then same color pattern arises and with the same sub-pixel orientations). It could instead be considered to repeat every twelve rows if a row is only formed of one orientation of sub-pixel. As mentioned above, a row should be considered as the set of pixels connected together by the pixel grid and addressing circuitry. This could be achieved in either configuration but of course treating a row as having more sub-pixels means more column conductors are required.

The sub-pixel color arrangement can thus be considered in the same way as in the examples above. An alternative is to consider that the color sequence of sub-pixels in the group as cyclically changing along the grid translation vector p and grid translation vector a. The order of color components in the group of the next row is obtained by cyclic permutation of colors of display elements of the group in the current row.

For example, for FIG. 30 the color change sequence along the p row vector is RBG and along the a vector is RBG.

Some further examples will now be given based on rhombic pixels. In each case, the slant s (or opposite sign for the different rhombus sides) and aspect ratio are 1/6.

Figure 31:
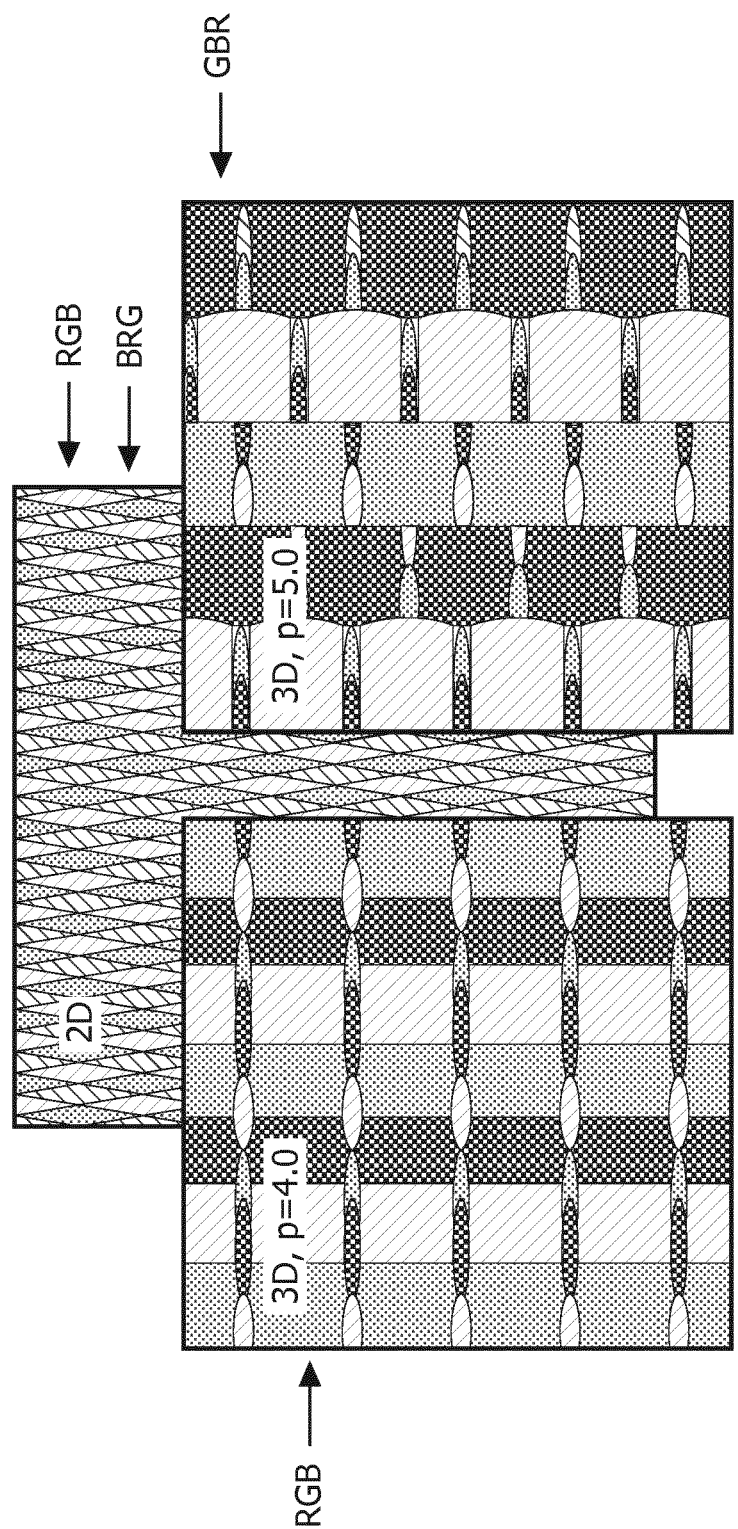
FIG. 31 shows a twenty first set of detailed examples of display panel for use in the device of the invention.

FIG. 31 shows an example in which each row of 2D sub-pixels has three colors, but the pattern repeats only every two rows (by "only" is meant that the sequence does not change more rapidly than every two rows). The sub-pixels in the column direction always have the same colors. In the 3D mode, the sub-pixels of each color (RGB) are distributed on vertical lines.

Figure 32:
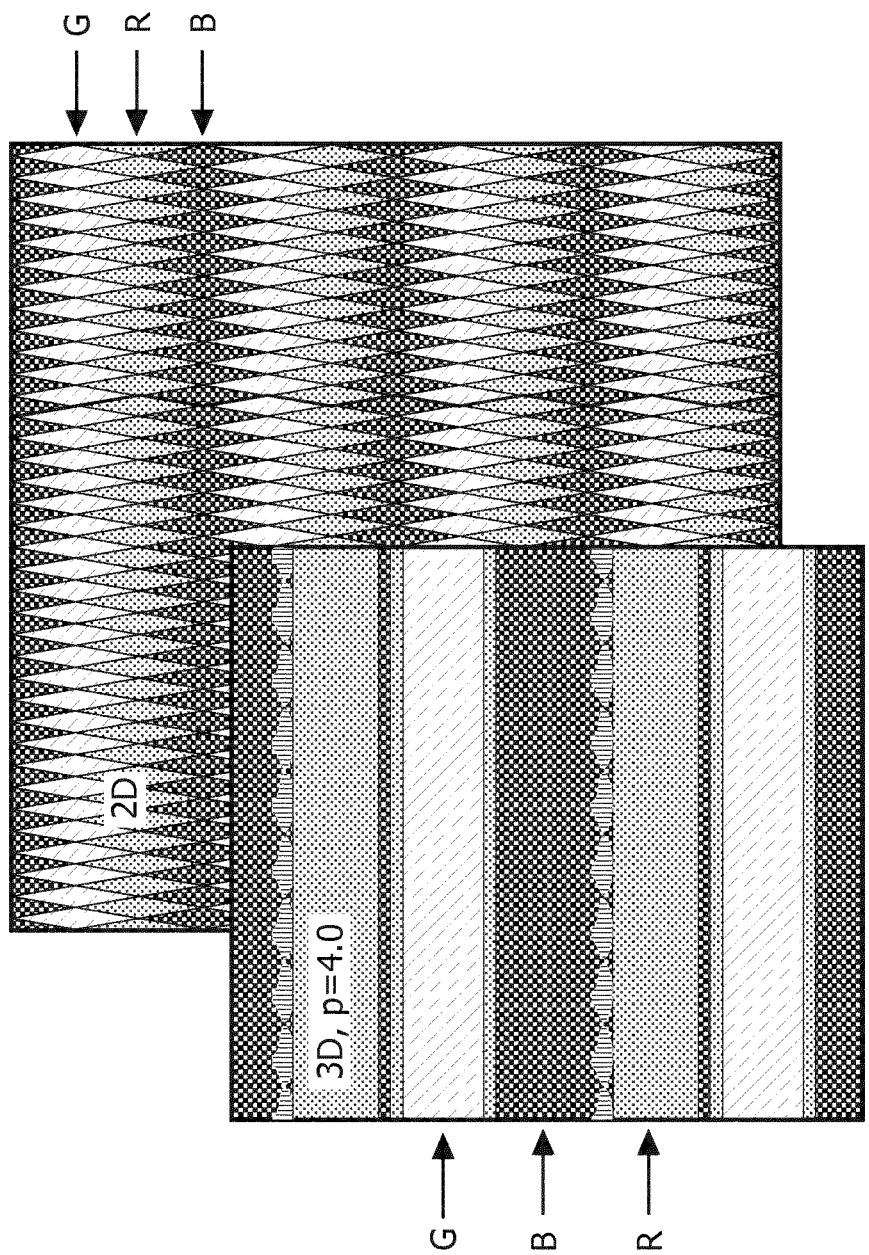
FIG. 32 shows a twenty second detailed example of display panel for use in the device of the invention.

FIG. 32 shows an example in which each row of 2D sub-pixels has only one color, and the pattern repeats every three rows so that there are three colors in total. In the 3D mode, the sub-pixels of each color (RGB) are distributed on horizontal lines.

Figure 33:
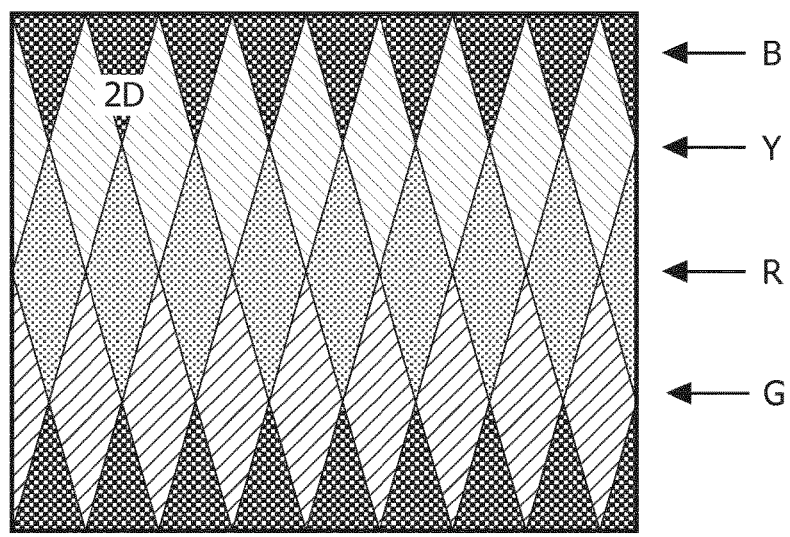
FIG. 33 shows a twenty third example of 2D display panel for use in the device of the invention.

FIG. 33 shows an example of 2D sub-pixel layout in which each row of 2D sub-pixels has only one color, and the pattern repeats every four rows so that there are three colors in total (red, green, blue, yellow). Again in the 3D mode, the sub-pixels of each color (RGBY) are distributed on horizontal lines.

Figure 34:
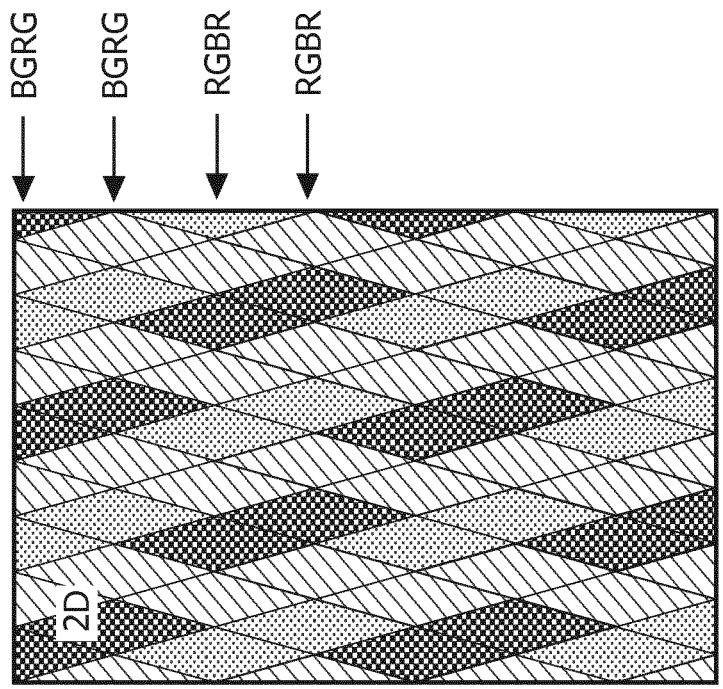
FIG. 34 shows a twenty fourth set of examples of 2D display panel for use in the device of the invention.
Figure 34:
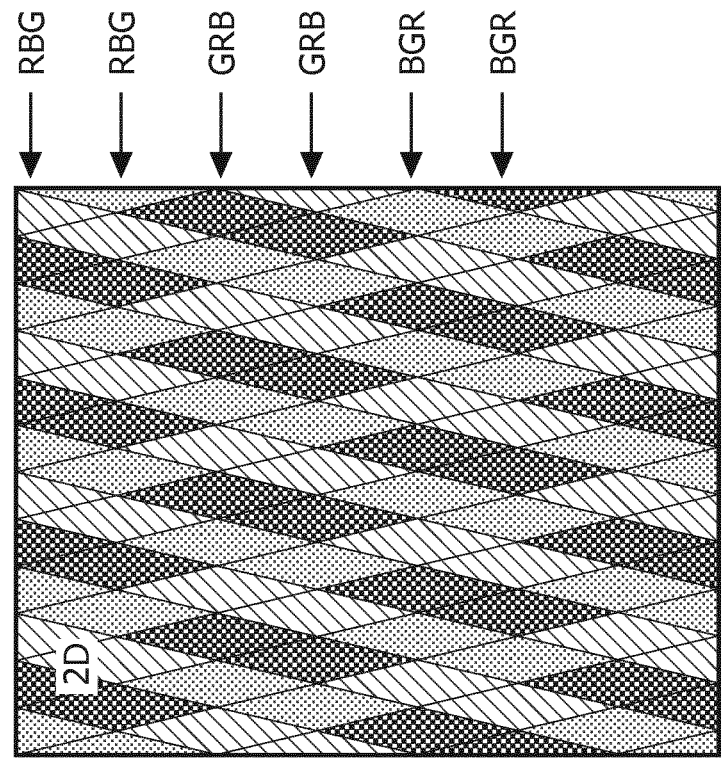

FIG. 34 shows two variations of 2D sub-pixel layout in which each row has three different color sub-pixels. In the example of FIG. 34(a), the row has RGB groups. The half sub-pixel shift between rows means the pattern only repeats every six rows. The half pixel shift means the adjacent rows are not aligned. Thus, it can be simpler to consider in terms of the translation vectors. In this case, the color sequence along the p row vector is RBG and along the a vector is RB from the same starting point and BG from another starting point and GB from another staring point. The color sequence of display elements in the group is cyclically changing along the grid translation vector p and changing according to a specific pattern along the grid translation vector a. The color sequence for the full panel is uniquely defined by the color sequence changes along the chosen grid unit vectors starting from one defined origin element in the grid. Display elements along the column q vector also change colors in cyclic order.

In the example of FIG. 34(b), the rows have RGBG groups. With the half sub-pixel shift between rows the pattern only repeats every four rows. In terms of the translation vectors, the color sequence along the p row vector is RGBG and along the a vector is RRGGBBGG.

Figure 35:
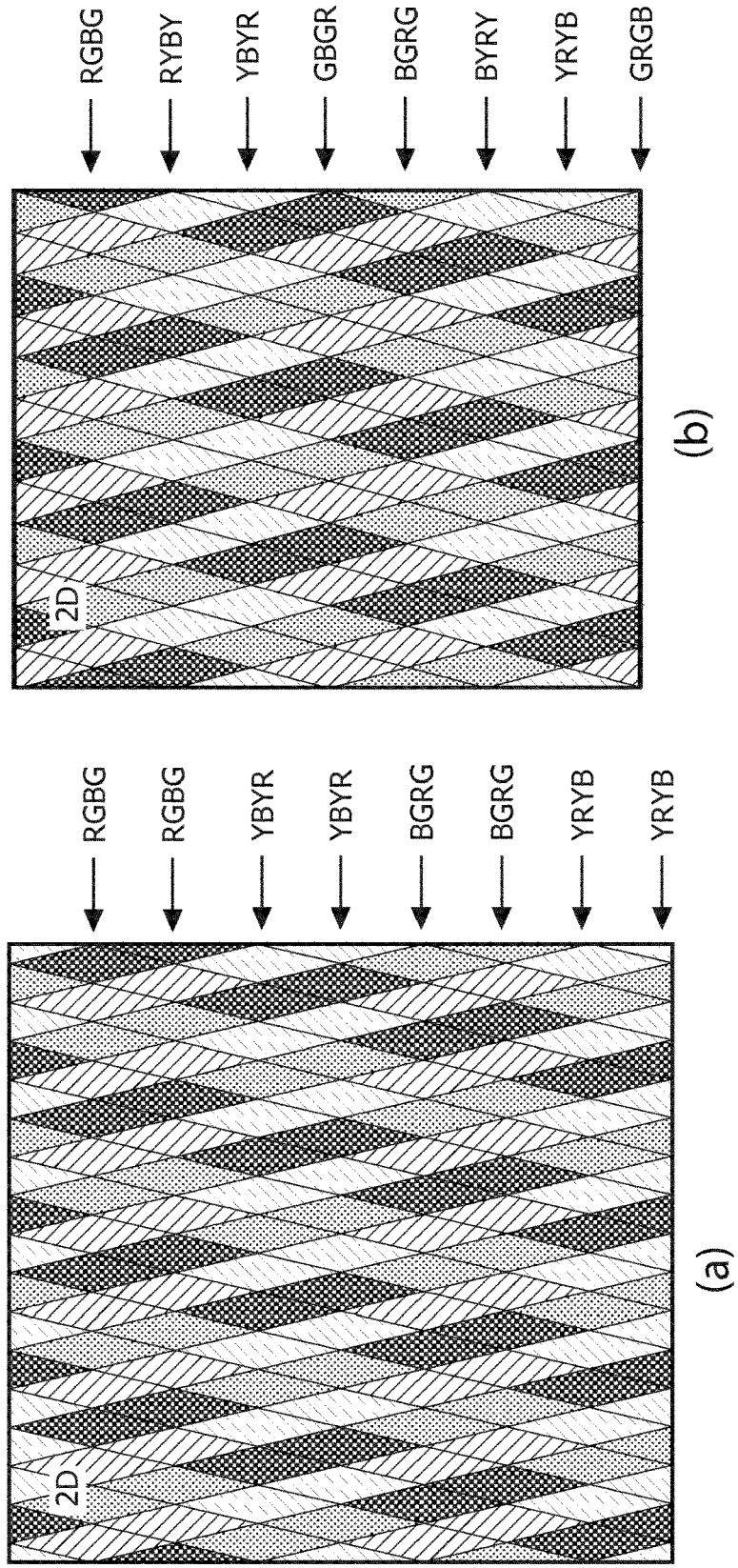
FIG. 35 shows a twenty fifth set of examples of 2D display panel for use in the device of the invention.

FIG. 35 shows two variations of 2D sub-pixel layout in which each row has four individually addressable sub-pixels in the row groups (which may have three or four different color components).

In the example of FIG. 35(a), pairs of rows have RGBG groups and then YBYR groups. The half sub-pixel shift between rows means the pattern only repeats every eight rows. The half pixel shift means the adjacent rows are not aligned. Thus, it can be simpler to consider in terms of the translation vectors. In this case, the color change sequence along the row p vector is RGBG for some rows and YBYR for others. Along the b vector the pattern is BGBY from one starting point and RGRY from another.

In the example of FIG. 35(b), adjacent pairs of rows have RGBG groups and then YBYR groups, but with different shifts between rows. Again, the half sub-pixel shift between rows means the pattern only repeats every eight rows. In this case, the color change sequence along the row p vector is RYBY from one starting point and along the b vector is either RYRG or RGRY. From another starting point the sequence along the p vector is RGBG and along the b vector is either RYRG or RGRY.

Figure 36:
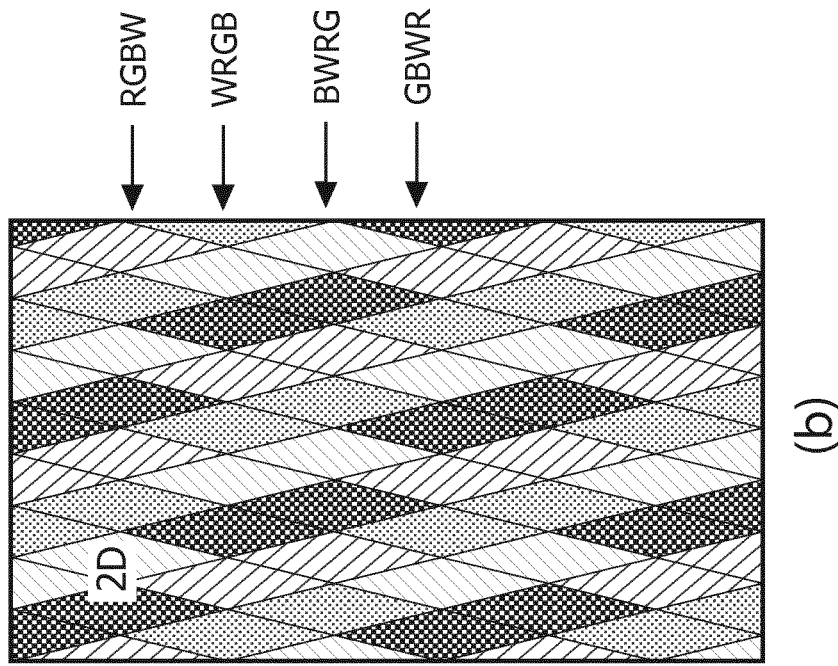
FIG. 36 shows a twenty sixth set of examples of 2D display panel for use in the device of the invention.
Figure 36:
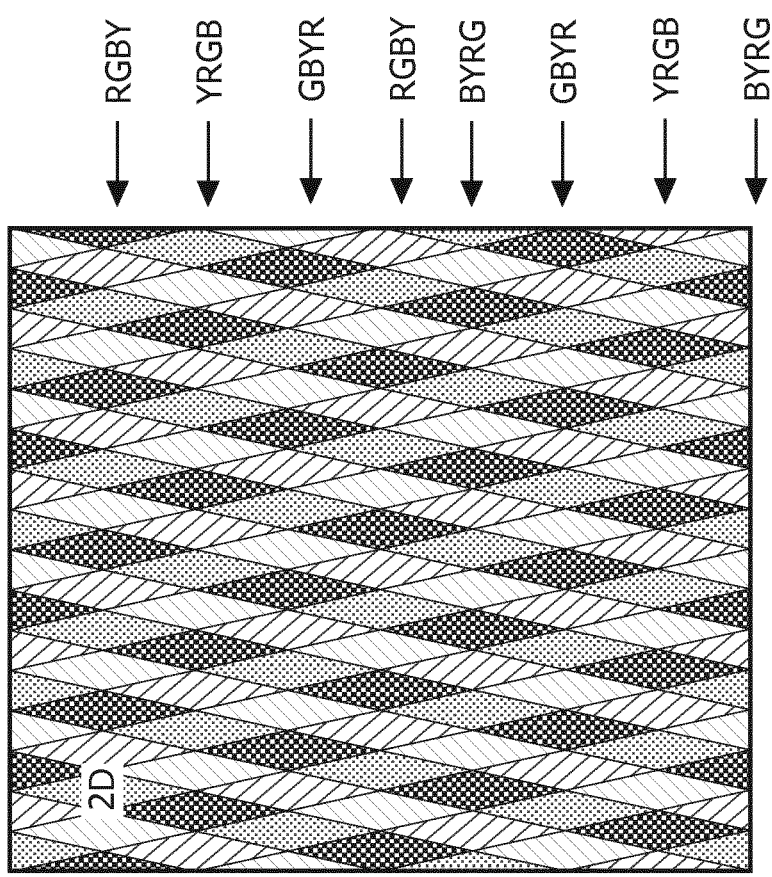

FIG. 36 shows two further variations of 2D sub-pixel layout in which each row has four different color sub-pixels.

In the example of FIG. 36(a) all rows have RGBY groups, and the pattern position cycles. The half sub-pixel shift between rows means the pattern only repeats every eight rows. The color change sequence along the row p vector is generally RxBy (in this case RGBY) and along the a vector is RyBx (i.e. RYBG in this example). In this example display elements along the column q vector also change colors in cyclic order. This panel results in good color distribution both in 2D and 3D mode.

In the example of FIG. 36(b) the color change sequence along the p vector is generally RxBy and along the a vector is RRyyBBxx. In this case x=green and y=white. Thus, the rows are all formed with RGBW groups. The row pattern repeats every four rows in this case.

When the display panel comprises three or more primary colors, the M nearest-neighbor sub-pixels from a selected sub-pixel (with shortest distance between the centers of sub-pixels both in row and column directions) can be arranged always to be of the color different to the color of selected sub-pixel (examples are FIGS. 30 and 31 for M=3 and FIG. 36(a) for M=4).

As explained above, the shape of the rhombus or triangular sub-pixels is such that along any arbitrary line parallel to the column and/or row direction the sub-pixels partially overlap with each other.

Figure 37:
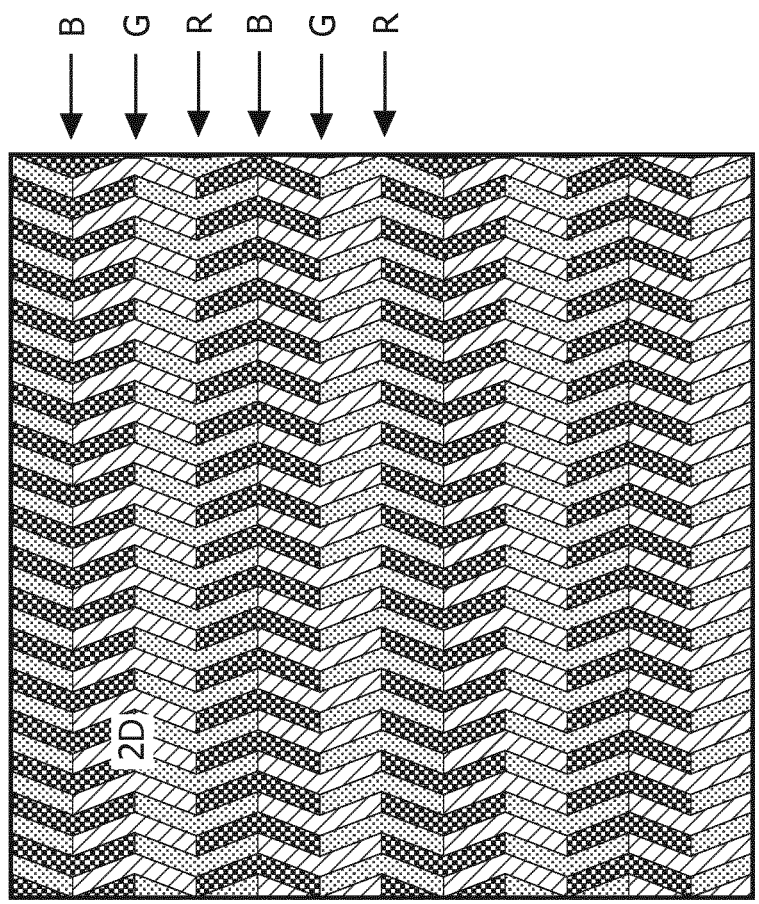
FIG. 37 shows a twenty seventh detailed example of display panel for use in the device of the invention.
Figure 37:
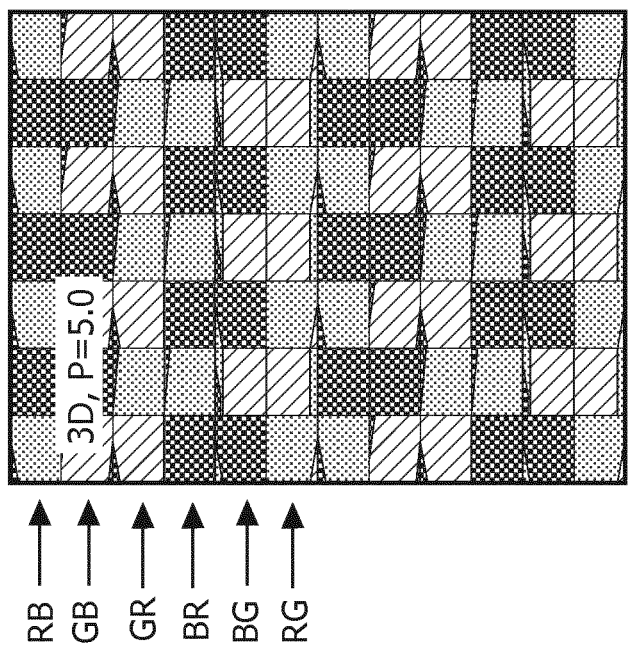

Other shapes can achieve this, for example FIG. 37 shows chevron shaped sub-pixels. These also have at least two opposing sides which are generally slanted with respect to the sides of the display area. Indeed, each chevron has four slanting sides.

As with triangular sub-pixels, there are different ways to define the rows, which depend on the hardware addressing scheme.

The chevron shapes are interleaved. If one row is defined (and addressed) as only the alternate chevrons (as marked in FIG. 37), there is then a half sub-pixel offset between rows. Along any line parallel to the row direction, there are only two color sub-pixels from two different rows. Because the rows are interleaved, one row can be considered to have only one color sub-pixel, but only occupying every other pixel space. Using this definition of a row, the pattern repeats every six rows because the chevrons change orientation, with a 180 degree rotation between each row, with a shift of half sub-pixel in the row and column direction The width of the chevron-shape can be controlled to optimize the intensity profile. Because the chevrons are interlocked there is no angle at which the black matrix becomes entirely visible. Hence banding is reduced. The design of this example thus has partial sub-pixel overlap in any arbitrary direction across the panel. The latter is important with micro lens arrays.

For triangular pixels, the analysis derives the preferred pitch values p=(1/Ka) where K is an integer value of 1 or 2 depending on the color ordering in the grid. The same applies to the hexagonal grids of rhombus pixels and rectangular grids of parallelogram-shaped pixels.

The various designs can aim to achieve different aims:
1. a=s is preferred for 1-to-1 2D to 3D sub-pixel mapping.
2. Certain pitch values are preferred to have square 3D sub-pixels. They will depend only on pixel aspect ratio and color ordering in the grid, with pitch values p satisfying $(1/Ka)-1 <= P <= (1/Ka)+1$ Examples of designs with K=2 are given in FIGS. 12 and 13.

As shown in some examples above, the slant direction of the display elements in the adjacent rows can be different. In this case, when viewing such a 3D display at different angles, the amount of black matrix projected for consecutive rows in angular space will be different. Thus the effect of regularity of the dark bands over the display will be further reduced and spread over the rows of a display. 3D pixels in consecutive rows appear to be slightly "tilted" in alternating directions for the consecutive rows. This creates an additional smoothening effect on the 3D view.

The examples above show the invention applied to lenticular lens displays. However, the concepts of the invention can be applied equally to autostereoscopic displays based on barriers. In a barrier display, the barrier opening can be considered to be the "view forming element". Furthermore, it is the relative slant between sub-pixel columns and the lenticular (or barrier) axis which is important. Thus, lenticulars or barriers can be provided over the sub-pixel grid as described above.

Furthermore, (micro)lens arrays can be used instead of lenticular lenses. These will be arranged in a regular rectangular grid, with no slant in the column direction.

Various example sub-pixel shapes have been presented above and the concept of partial sub-pixel overlap in the row and/or column directions has been explained. The partial pixel overlap can be in any possible direction across the panel.

It can be seen from the examples above that to have the 3D sub-pixels on a square grid, the centres of the 2D sub-pixels should be on a rectangular grid. The use of slanted sub-pixel shapes means that these slanted edges form slanted continuous or discontinuous lines across the panel.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. An autostereoscopic display device comprising:
a display comprising an array of pixels,
wherein the pixels are arranged to produce a display,
wherein the array defines a display area, the display area having a first side and a second side and a top and a bottom,
wherein the pixels are arranged in orthogonal rows and columns of sub-pixels,
wherein the rows are parallel to the top and the top is parallel to the bottom,
wherein the columns are parallel to the first side and the second side is parallel to the first side; and
a view forming arrangement, the view forming arrangement arranged in registration with the display, wherein the view forming arrangement is arranged to project a plurality of views towards a user, wherein each of the plurality of views are oriented in different directions,
wherein the sub-pixels comprise at least two opposing sides which are slanted with respect to the sides of the display area,
wherein a sub-pixel color pattern for the rows repeats every two rows to define a plurality of row sets,
wherein each row comprises sub-pixels of at least two colors,
wherein no adjacent sub-pixels in a direction parallel to the top have the same color, and
wherein no adjacent sub-pixels have the same color in the first side direction.

2. The device as claimed in claim 1,
wherein the display comprises successive row sets,
wherein each row set comprises a first row of sub-pixels with a first row color pattern of two colors and a second row of sub-pixels with a second row color pattern of two colors, and
wherein the second row color pattern is different from the first row color pattern.

3. The device as claimed in claim 2,
wherein the first row color pattern comprises a repeating pattern Rx,
wherein the second row color pattern comprises a repeating pattern yB,
wherein R is a red sub-pixel,
wherein B is a blue sub-pixel,
wherein x and y are selected from the group consisting of yellow, green, white and cyan.

4. The device as claimed in claim 3, wherein the display comprises successive column sets, each column set comprising a first column of sub-pixels with a first column color pattern and a second column of sub-pixels with a second column color pattern, and wherein the first column color pattern comprises a repeating pattern xB and the second column color pattern comprises a repeating pattern Ry.

5. The device as claimed in claim 1,
wherein each row set comprises a first row of sub-pixels with a first row color pattern of three colors and a second row of sub-pixels with a second row color pattern of three colors, and
wherein the first row color pattern is different from the second row color patterns.

6. The device as claimed in claim 1,
wherein each row set comprises a first row and a second row,
wherein the first row of sub-pixels has a first row color pattern of four colors,
wherein the color with strongest visibility occurs twice,
wherein the second row of sub-pixels has a second row color pattern of four colors,
wherein the color with strongest visibility occurs twice,
wherein the four colors comprise red, x, blue and y, and
wherein x and y are selected from the group consisting of green, yellow, white and cyan.

7. An autostereoscopic display device, comprising:
a display having an array of display pixels arranged to produce a display, the array defining a display area,
wherein the display area has a first side and a second side and a top and a bottom,
wherein the display pixels are arranged in orthogonal rows and columns of sub-pixels,
wherein the rows are parallel to the top and the bottom,
wherein the columns are parallel to the first side and the second side; and
a view forming arrangement arranged in registration with the display for projecting a plurality of views towards a user, wherein the plurality of views are in different directions,
wherein the sub-pixels comprise at least two opposing sides which are slanted with respect to one of the first side and the second side,
wherein the display comprises successive row sets,
wherein each row set comprises a first row of sub-pixels, a second row of sub-pixels, a third row of sub-pixels and a fourth row of sub-pixels,
wherein the first row of sub-pixels has a first row color pattern of two colors, wherein the second row of sub-pixels has a second row color pattern which is the same as the first row color pattern, wherein the third row of sub-pixels has a third row color pattern of two colors, wherein the fourth row of sub-pixels has a fourth row color pattern which is the same as the third row color pattern, wherein the third row color patterns is different from the first row color patterns.

8. The device as claimed in claim 7, wherein the first row color patterns comprises a repeating pattern Rx, the third row color patterns comprises a repeating pattern yB, wherein R is a red sub-pixel, wherein B is a blue sub-pixel, wherein x and y are selected from the group consisting of yellow, green, white and cyan sub-pixels.

9. The device as claimed in claim 8, wherein the display comprises successive column sets, wherein each column set comprises a first column of sub-pixels, a second column of sub-pixels, a third column of sub-pixels and a fourth column of sub-pixels, wherein the first column of sub-pixels has a first column color pattern, wherein the second column of sub-pixels has a second column color pattern, wherein the second column color pattern is the same as the first column color pattern, wherein the third column of sub-pixels has a third column color pattern, wherein the fourth column of sub-pixels has a fourth column color pattern which is the same as the third column color pattern, wherein the first column color patterns comprises a repeating pattern xB, wherein the equal third column color patterns comprises a repeating pattern Ry.

10. An autostereoscopic display device, comprising:

a display having an array of display pixels arranged to produce a display, the array defining a display area, wherein the display area has a first side and a second side and a top and a bottom, wherein the display pixels are arranged in orthogonal rows and columns of sub-pixels, wherein the rows are parallel to the top and the bottom, wherein the columns are parallel to the first side and the second side; and a view forming arrangement arranged in registration with the display for projecting a plurality of views towards a user, wherein the plurality of views are in different directions, wherein the sub-pixels comprise at least two opposing sides which are slanted with respect to one of the first side and the second side, wherein for at least two adjacent rows the sub-pixels in the same columns do not all have the same color, wherein the sub-pixel color pattern for the rows repeats every three rows to define a plurality of sets of three rows, wherein each set includes a first row of sub-pixels, a second row of sub-pixels and a third row of sub-pixels, wherein the first row of sub-pixels has a first row color pattern of three colors, wherein the second row of sub-pixels has a second row color pattern of three colors, wherein the third row of sub-pixels has a third row color pattern of three colors, wherein the first row color pattern and the second row color pattern and the third row color pattern are different from each other.

11. The device as claimed in claim 10, wherein the display comprises columns of sub-pixels which repeat their sub-pixel color pattern every three columns, wherein some columns comprise only pixels of color x and/or y, wherein x and y are chosen from the group consisting of green, yellow, white and cyan.

12. An autostereoscopic display device, comprising:

a display having an array of display pixels arranged to produce a display, the array defining a display, wherein the display area has a first side and a second side and a top and a bottom, wherein the display pixels are arranged in orthogonal rows and columns of sub-pixels, wherein the rows are parallel to the top and the bottom, wherein the columns are parallel to the first side and the second side; and a view forming arrangement arranged in registration with the display for projecting a plurality of views towards a user, wherein the plurality of views are in different directions, wherein the sub-pixels comprise at least two opposing sides, wherein the two opposing sides of the sub-pixels are slanted with respect to one of the first side and the second side of the display area, wherein at least two adjacent rows the sub-pixels do not have the same color in the same columns, wherein a sub-pixel color pattern for the rows repeats every four rows to define a plurality of sets of four rows, each set comprising:

a first row of sub-pixels having a first row color pattern, the first row color pattern comprising a repeating pattern BR;

a second row of sub-pixels having a second row color pattern, the second row color pattern comprising a repeating pattern xy;

a third row of sub-pixels having a third row color pattern, the third row color pattern comprising a repeating pattern RB; and a fourth row of sub-pixels having a fourth row color pattern, the fourth row color pattern comprising a repeating pattern yx, wherein x and y are chosen from the group consisting of green, yellow, white and cyan and wherein at least one of the columns comprises the repeating pattern xy and at least another one of the columns comprises the repeating pattern yx.

13. A device as claimed in claim 1, wherein each sub-pixel has a center of area, wherein each row of sub-pixels has the sub-pixel centers of area shifted with respect to the adjacent rows of sub-pixels by a first fraction of the sub-pixel pitch in the row direction, wherein each column of sub-pixels has the sub-pixel centers of area shifted with respect to the adjacent columns of sub-pixels by a second fraction of the sub-pixel pitch in the column direction.

14. The device as claimed in claim 13, wherein the first fraction and second fraction are each ½.

15. A device as claimed in claim 1, wherein each sub-pixel of the display comprises a parallelogram shape with top and bottom edges, wherein the top and bottom edges are slanted with respect to the top and the bottom of the display area, wherein a first side of the parallelogram is slanted with respect to the first side of the display area and a second side of the parallelogram is slanted with respect to the second side of the display area.

16. The device as claimed in claim 15, wherein all of the sub-pixels are slanted in a same slant direction.

17. The device as claimed in claim 1, wherein each sub-pixel of the display comprises a parallelogram shape, the parallelogram having a first side and second side opposite each other and a third and fourth side opposite each other, wherein the first side of the parallelogram and the second side of the parallelogram have a first slant direction with respect to the direction of the first side of the display area, wherein the third side of the parallelogram and the fourth side of the parallelogram have a second slant direction with respect to the direction of the first side of the display area.

18. The device as claimed in claim 17, wherein each sub-pixel of the display comprises a rhombus shape.

19. The device as claimed in claim 1, wherein each sub-pixel of the display comprises a triangle shape with a first edge, a second edge and a third edge, wherein the first edge the second edge have different slant directions with respect to the direction of the first side of the display area, and a wherein the third edge is parallel to the direction of the top.

20. The device as claimed in claim 1, wherein each sub-pixel of the display comprises at least four edges, a first edge, a second edge, a third edge and a fourth edge, wherein the first and the second edges have a first slant direction with respect to the direction of the first side of the display area, and the third and the fourth edges have an opposite slant direction with respect to the direction of first side of the display area.

21. The device as claimed in claim 20, where the sub-pixels of the display are arranged so that in any direction across the display panel the adjacent pixels partially overlap.

22. The device as claimed in claim 1, wherein each sub-pixel has an aspect ratio the aspect ratio comprising the ratio of a maximum width of the sub-pixel to a maximum height of the sub-pixel, wherein $\theta$ is a slant angle with respect to the first side of the display area, wherein the slant direction has a slant value $s=\tan \theta$, wherein the aspect ratio is between 0.8 s and 1.2 s.

23. The device as claimed in claim 1, wherein the view forming arrangement comprises elongate elements.

24. The device as claimed in claim 1, wherein the view forming arrangement comprises an array of lenses arranged in a grid, wherein at least a portion of the grid lines are parallel to the first side.

25. The device as claimed in claim 23, wherein each sub-pixel has an aspect ratio a, the aspect ratio a comprising the ratio of a maximum width of the sub-pixel to a maximum height of the sub-pixel, wherein in the view forming arrangement the elongate elements have a pitch P, wherein the pitch P is expressed in units of the width of the display sub-pixels, wherein a value K is an integer, wherein $(1/K*a)-1<=P<=(1/K*a)+1$.

26. The device as claimed in claim 15, wherein alternate rows of sub-pixels have opposite slant directions with respect to the direction of the first side of the display area.

27. The device of claim 1, wherein each row comprises sub-pixels of exactly two colors.

28. The device of claim 12, wherein subpixels of the first row contact sub-pixels of the third row, and sub-pixels of the second row contact sub-pixels of the fourth row.

* * * * *